United States Patent
Wilson et al.

(10) Patent No.: US 12,316,762 B2
(45) Date of Patent: May 27, 2025

(54) APPLICATIONS AS RESOURCE PRINCIPALS OR SERVICE PRINCIPALS

(71) Applicant: Oracle International Corporation, Redwood Shores, CA (US)

(72) Inventors: Gregg Alan Wilson, Austin, TX (US); Ayman Mohammed Aly Hassan Elmenshawy, Bellevue, WA (US); Girish Nagaraja, Sammamish, WA (US); Venkata Rama Prasad Tammana, Redmond, WA (US); Gary Philip Cole, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 17/953,175

(22) Filed: Sep. 26, 2022

(65) Prior Publication Data
US 2023/0109109 A1   Apr. 6, 2023

Related U.S. Application Data

(60) Provisional application No. 63/250,980, filed on Sep. 30, 2021, provisional application No. 63/250,992, filed on Sep. 30, 2021.

(51) Int. Cl.
*H04L 9/32* (2006.01)
*H04L 9/08* (2006.01)

(52) U.S. Cl.
CPC .......... *H04L 9/3213* (2013.01); *H04L 9/0861* (2013.01); *H04L 9/3247* (2013.01)

(58) Field of Classification Search
CPC ... H04L 9/0861; H04L 9/3213; H04L 9/3234; H04L 9/3247
See application file for complete search history.

(56) References Cited

U.S. PATENT DOCUMENTS

| 7,657,639 B2 | 2/2010 | Hinton |
| 8,020,007 B1 | 9/2011 | Zubovsky |

(Continued)

FOREIGN PATENT DOCUMENTS

EP    2761522 B1    6/2016

OTHER PUBLICATIONS

Takahiko Kawasaki, Illustrated DPOP (OAuth Access Token Security Enhancement) 1-23 (Apr. 29, 2020) (https://darutk.medium.com/illustrated-dpop-oauth-access-token-security-enhancement-801680d761ff) (Year: 2020).*

(Continued)

*Primary Examiner* — Sharon S Lynch
(74) *Attorney, Agent, or Firm* — Kilpatrick Townsend & Stockton LLP

(57) ABSTRACT

Techniques are provided for granting an application of a first type of identity system, which uses a first type of identity token, access to a second type of identity system, which uses a second type of identity token. An application can make a request to a token exchange system. The request can include a bearer token and a public key of the application. The token exchange system can exchange the bearer token for a Proof-of-Possession token after performing verification steps. A token exchange system can exchange the first token (e.g., bearer token) for the first identity system for the second token (e.g., Proof-of-Possession token) for the second identity system without requiring entry of credentials to access the second identity system.

19 Claims, 19 Drawing Sheets

(56) References Cited

U.S. PATENT DOCUMENTS

| | | | |
|---|---|---|---|
| 8,209,753 B2* | 6/2012 | Wen | H04L 9/0838 713/172 |
| 8,434,129 B2* | 4/2013 | Kannappan | G06Q 10/10 726/22 |
| 8,752,152 B2* | 6/2014 | Kol | H04L 9/3271 726/8 |
| 9,602,508 B1* | 3/2017 | Mahaffey | H04L 9/3271 |
| 9,774,581 B2* | 9/2017 | Leicher | H04L 63/08 |
| 9,781,122 B1 | 10/2017 | Wilson et al. | |
| 9,838,376 B1 | 12/2017 | Lander et al. | |
| 10,255,061 B2 | 4/2019 | Lander et al. | |
| 10,275,723 B2* | 4/2019 | Buss | G06Q 10/00 |
| 10,341,410 B2 | 7/2019 | Lander et al. | |
| 10,425,386 B2 | 9/2019 | Wardell et al. | |
| 10,454,940 B2 | 10/2019 | Lander et al. | |
| 10,455,025 B2* | 10/2019 | Burch | H04L 63/18 |
| 10,484,243 B2 | 11/2019 | Cole et al. | |
| 10,484,382 B2 | 11/2019 | Wilson et al. | |
| 10,505,916 B2* | 12/2019 | Engan | H04L 63/0272 |
| 10,511,589 B2 | 12/2019 | Gangawane et al. | |
| 10,594,684 B2 | 3/2020 | Bansal et al. | |
| 10,616,224 B2 | 4/2020 | Subramanian et al. | |
| 10,715,564 B2 | 7/2020 | Mohamad Abdul et al. | |
| 10,742,636 B2 | 8/2020 | Deshpande et al. | |
| 10,798,165 B2 | 10/2020 | Srinivasan et al. | |
| 10,846,390 B2 | 11/2020 | Subramanian et al. | |
| 10,878,079 B2 | 12/2020 | Vepa et al. | |
| 10,931,656 B2* | 2/2021 | Carru | H04L 63/0428 |
| 11,061,929 B2 | 7/2021 | Xu et al. | |
| 11,121,873 B2* | 9/2021 | Schmaltz | H04L 9/3242 |
| 11,165,634 B2 | 11/2021 | Medam et al. | |
| 11,258,775 B2* | 2/2022 | Lander | G06F 3/0607 |
| 11,303,627 B2* | 4/2022 | Maria | H04L 63/0815 |
| 11,308,132 B2 | 4/2022 | Srinivasan et al. | |
| 11,321,343 B2 | 5/2022 | Srinivasan et al. | |
| 11,509,644 B2* | 11/2022 | Smith | G16Y 30/10 |
| 11,528,262 B2* | 12/2022 | Carru | H04L 41/28 |
| 11,546,159 B2* | 1/2023 | Sugarev | H04L 9/0819 |
| 11,563,580 B2* | 1/2023 | Sugarev | H04L 9/0891 |
| 11,595,215 B1* | 2/2023 | Madden | H04L 63/0807 |
| 11,595,389 B1* | 2/2023 | Madden | H04L 9/0643 |
| 11,606,210 B1* | 3/2023 | Madden | H04L 63/10 |
| 11,736,469 B2* | 8/2023 | Maria | H04L 63/0815 |
| 11,757,645 B2* | 9/2023 | Sugarev | G06Q 20/3829 |
| 11,997,207 B2* | 5/2024 | Madden | H04L 9/0891 |
| 2004/0143730 A1* | 7/2004 | Wen | H04L 63/0421 713/150 |
| 2007/0179802 A1* | 8/2007 | Buss | G06Q 10/06 726/4 |
| 2009/0064107 A1 | 3/2009 | Chan et al. | |
| 2009/0089625 A1* | 4/2009 | Kannappan | G06Q 10/10 714/39 |
| 2011/0145565 A1* | 6/2011 | Kol | H04L 51/00 713/170 |
| 2013/0191884 A1* | 7/2013 | Leicher | H04L 63/08 726/4 |
| 2014/0189808 A1* | 7/2014 | Mahaffey | G06F 21/6245 726/4 |
| 2015/0150109 A1 | 5/2015 | Bocanegra et al. | |
| 2017/0063840 A1 | 3/2017 | Krishnaiah | |
| 2018/0041510 A1* | 2/2018 | Burch | H04L 63/18 |
| 2019/0124070 A1* | 4/2019 | Engan | H04L 9/3247 |
| 2019/0306138 A1* | 10/2019 | Carru | H04L 63/10 |
| 2019/0312857 A1* | 10/2019 | Lander | H04L 9/3271 |
| 2019/0372962 A1* | 12/2019 | Maria | G06F 21/41 |
| 2020/0169549 A1* | 5/2020 | Smith | H04L 63/101 |
| 2020/0259652 A1* | 8/2020 | Schmaltz, III | H04L 9/30 |
| 2020/0264860 A1 | 8/2020 | Srinivasan et al. | |
| 2021/0081252 A1 | 3/2021 | Bhargava et al. | |
| 2021/0084031 A1 | 3/2021 | Lao et al. | |
| 2021/0168128 A1* | 6/2021 | Carru | H04L 63/0807 |
| 2022/0191188 A1* | 6/2022 | Maria | H04L 63/0815 |
| 2022/0239483 A1* | 7/2022 | Sugarev | H04L 9/3247 |
| 2023/0138368 A1* | 5/2023 | Sugarev | H04L 9/3213 713/176 |
| 2023/0336536 A1* | 10/2023 | Maria | H04L 63/0815 |

OTHER PUBLICATIONS

Danny Shemesh, Service to Service Auth with Azure AD, MSI and OAuth 2.0 (Step by Step) 1-37 (Oct. 21, 2019) (https://medium.com/@dany74q/service-to-service-auth-with-azure-ad-msi-oauth-2-0-step-by-step-a1aed196b1e1) (Year: 2019).*

Acquire a Token from Azure AD for Authorizing Requests from a Client Application, Microsoft, Available Online at: https://docs.microsoft.com/en-us/azure/storage/common/storage-auth-aad-app?tabs=dotnet, Jul. 12, 2020, 12 pages.

Authentication and Token Generation for API usage, Tradelens, Available Online at: https://docs.tradelens.com/how_to/token_generation/, Accessed from Internet on Sep. 27, 2021, 11 pages.

Chapter 7. Token Exchange, Redhat, Available Online at: https://access.redhat.com/documentation/en-us/red_hat_single_sign-on/7.2/html/securing_applications_and_services_guide/token-exchange, Accessed from internet on Sep. 27, 2021, 19 pages.

Cloud IAM Authentication and Authorization for Platform Service (Beta), IBM, Available Online at: https://www.ibm.com/docs/en/watson-iot-platform?topic=security-cloud-iam-authentication-authorization, Accessed from Internet on Sep. 27, 2021, 4 pages.

Creating Short-Lived Service Account Credentials, Google Cloud, Available Online at: https://cloud.google.com/iam/docs/creating-short-lived-service-account-credentials, Accessed from Internet on Sep. 27, 2021, 30 pages.

Demonstration of Proof-of-Possession Overview, Curity, Available Online at: https://curity.io/resources/learn/dpop-overview/, Accessed from Internet on Sep. 29, 2021, 4 pages.

External Identity Providers, Okta Developer, Available Online at: https://developer.okta.com/docs/concepts/identity-providers/, Accessed from Internet on Sep. 29, 2021, pp. 1-6.

Federated Identity Blueprint, Decision Framework, Final Version V1.0.0, Available Online at: https://www.qgcio.qld.gov.au/_data/assets/word_doc/0017/4751/6.-Federated-identity-blueprint-Decision-framework-v100.docx, May 2017, 47 pages.

How to Convert Bearer Token into Authentication Cookie for MVC App, Stack Overflow, Available Online at: https://stackoverflow.com/questions/38276089/how-to-convert-bearer-token-into-authentication-cookie-for-mvc-app, Accessed from Internet on Sep. 27, 2021, 3 pages.

Rashid, Exchange Generic OIDC Credentials for GCP Credentials Using GCP STS Service, Available Online at: https://medium.com/google-cloud/exchange-generic-oidc-credentials-for-gcp-credentials-using-gcp-sts-service-263fb74ff758, Nov. 4, 2020, 15 pages.

"Security of the Mission Critical (MC) Service", 3GPP Standard; Technical Specification; 3GPP TS 33.180, 3rd Generation Partnership Project (3gpp), Mobile Competence Centre; 650, Route Des Lucioles, Sep. 23, 2021, pp. 1-204.

Hunt et al., "OAuth 2.0 1-19 Proof-of-Possession (PoP) Security Architecture", Draft-IETF-Oauth-Pop-Architecture-06.txt, Internet Engineering Task Force, IETF; Standardworkingdraft, Internet Society (Isoc) 4, Rue Des Falaises Ch-1205 Geneva, Switzerland, Nov. 24, 2015, 46 pages.

PCT/US2022/044894, "International Search Report and Written Opinion", dated Jan. 19, 2023, 14 pages.

U.S. Appl. No. 17/953,172, "Non-Final Office Action", mailed Jul. 18, 2024, 11 pages.

OAuth Token Exchange API, Available Online at: https://indigo-iam.github.io/docs/v/current/user-guide/api/oauth-token-exchange.html, Patentability Search Report, downloaded on Sep. 28, 2021, 4 pages.

U.S. Appl. No. 17/953,172, "Final Office Action", dated Nov. 14, 2024, 11 pages.

* cited by examiner

APPLICATIONS AS RESOURCE PRINCIPALS OR SERVICE PRINCIPALS

CROSS-REFERENCE TO RELATED APPLICATIONS

The present application is a non-provisional application of and claims the benefit and priority under 35 U.S.C. 119(e) of U.S. Provisional Application No. 63/250,992, filed Sep. 30, 2021 entitled "TOKEN EXCHANGE BETWEEN BEARER AND POP TOKENS," and U.S. Provisional Application No. 63/250,980, filed Sep. 30, 2021 entitled "APPLICATIONS AS RESOURCE PRINCIPALS OR SERVICE PRINCIPALS," the entire contents of which are incorporated herein by reference for all purposes.

BACKGROUND

In order to interact with an identity management system, such as an Infrastructure Identity and Access Management (IAM) system and Identity Cloud Service (IDCS) system, an access token is needed. For example, with an IAM system, a token can include a Proof of Possession (PoP) token and with an Identity Cloud Service (IDCS) system a token can include a bearer token. If a user would like to access services or resources of different identity access management systems, a user would need a separate access token in order to access each type of identity access management system.

However, it is burdensome on the user to manage different tokens for different identity management systems. Further, in a given session, a user may interact between different identity management systems, thereby requiring different access tokens to access features of the different identity management systems. Requiring the user to obtain and provide different access tokens interrupts a workflow and produces inefficiencies in performing tasks.

Further, a user would have to maintain a set of credentials to manage services for each type of identity management system. The user would have to login to each identity management system separately and obtain separate access tokens for communicating with each identity management system. Further, access tokens for each type of identity management system would be stored separately for each identity system.

Further, some entities, such as applications, that have bearer tokens may not be able to exchange their bearer token for a PoP token. Specifically, some entities may not have privileges which allow them to exchange a bearer token for a PoP token. This creates additional difficulties if the entity is an application and the application would like to access resources or services that require a PoP token, such as resources and services in an IAM identity system.

Example embodiments of the disclosure address these and other problems, individually and collectively.

BRIEF SUMMARY

Example embodiments relate to a token exchange between different identity management systems. Specifically, example embodiments relate to exchanging bearer type tokens of a first type of identity management system with proof of possession (PoP) type tokens of a second type of identity management system, and vice versa.

Example embodiments also relate to exchange of a bearer token for a Proof of Possession token, for entities such as applications. Entities, such as applications, are provided an identity which provides additional privileges. The application can exchange a bearer token for a Proof of Possession token in order to obtain additional privileges.

Different identity management systems follow different specifications. Therefore, in order to access different identity management systems, access tokens specific to each identity system is needed. Example embodiments allow for the seamless exchange of tokens to be used in different identity management systems. Therefore, an entity can access features of both identity management systems.

For example, a first type of token (e.g., bearer token, OAuth access token) that is used to access a first identity management system (e.g., Identity Cloud Service (IDCS)) can be exchanged for a second type of token (e.g., proof of possession (PoP) token) that is used to access a second identity management system (e.g., Infrastructure Identity and Access Management (IAM)), and vice versa. Infrastructure Identity and Access Management (IAM) can also be referred to as Identity and Access Management (IAM)). Identity Cloud Service (IDCS) and Infrastructure Identity and Access Management (IAM) can be generally referred to as identity systems.

While a separate token for a second identity system is obtained, the entity continues to manage the token for the first identity system. Therefore, the entity will have forward compatibility with the second identity system the entity would like to access, while the entity continues to have backward compatibility with the first identity system for which the entity has an access token.

In example embodiments, a first identity system is an IDCS system and a second identity system is an IAM system. However, this is merely for ease of explanation. The first identity system can be any identity system that is different from the second identity system and that follows a different specification. A specification can refer to the rules required for operating the first or second identity system. The specification ensures that the identity system can operate correctly and that interactions between components will work correctly.

An example embodiment can exchange a token for an IDCS system that is compatible with an IAM system, and vice versa, while maintaining the token needed to communicate with each system. Therefore, an entity no longer has to maintain two sets of credentials and the user does not need to log into two separate systems. The current token the entity has can be exchanged automatically by an integrated identity management system (IDMS) so as to be compatible with the identity system being accessed. The integrated identity management system (IDMS) can also be referred to as an integrated management system.

An entity can include any entity that accesses resources of the first identity system and the second identity system. The entity can also be referred to as the user or customer of the first identity system and the second identity system.

An example embodiment does not require a user to login into each identity management system separately and does not require a user to maintain login credentials for each identity management system. Instead, a user may login to one identity system and the access token that is generated for the identity system to which the user is logged into can be exchanged for an access token for a different identity system without the user being aware of the exchange. A token exchange system of an integrated identity management system (IDMS) can manage, store and maintain the tokens needed to access each identity system.

Therefore, a user can interact with different identity systems without requiring to login separately and without having to maintain separate credentials and access tokens.

The entity can seamlessly work between identity management systems that use different types of tokens. This decreases interruptions to a product workflow.

In order to access certain resources and services in, for example, an IAM system, an entity would need an identity. However, some entities may not be currently assigned an identity. For example, applications in an IDCS system use bearer tokens and are not assigned an identity. Such entities would not be able to access resources or services in an IAM, since IAM requires that the entity have an identity.

Therefore, example embodiments provide an identity for entities, such as applications, which do not currently have an identity. Such entities are then able to exchange their bearer token for a Proof of Possession token and can thus communicate with resources and services that require an identity, such resources and services in an IAM.

An example embodiment can include a method including determining, by a token exchange system of an integrated identity management system of a cloud service, that an entity is authorized to access a first identity system, wherein the entity has a first token, receiving, by the token exchange system from the entity of the first identity system, a request to access a second identity system, verifying, by the token exchange system, the first token, generating, by the token exchange system, a second token for the second identity system based on the first token for the first identity system, authenticating, by the token exchange system, the entity to access the second identity system based on the second token, and authorizing, by the token exchange system, the entity to access an application programming interface (API) of the second identity system using the second token.

An example embodiment can include a method including determining, by a token exchange system of an integrated identity management system of a cloud service, that an entity is authorized to access a first identity system, wherein the entity is an application, generating, by the token exchange system, a first request for the entity to access a second identity system, wherein the first request includes a bearer token and a first public key associated with the entity, verifying, by the token exchange system, that the bearer token is a valid bearer token, verifying, by the token exchange system, whether a role of the entity is a role that is authorized to access the second identity system, generating, by the token exchange system, a second token based on the bearer token and the first public key received in the first request, and sending, by the token exchange system, the second token to the entity, wherein the second token is associated with the second identity system, and the second token includes the first public key of the entity.

An example embodiment can also include a non-transitory computer-readable storage medium storing a plurality of instructions executable by one or more processors to cause the one or more processors to perform the methods described above.

An example embodiment can also include a computing system including a memory, and one or more processors coupled to the memory and configured to perform the methods described above.

Other embodiments are directed to systems, devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
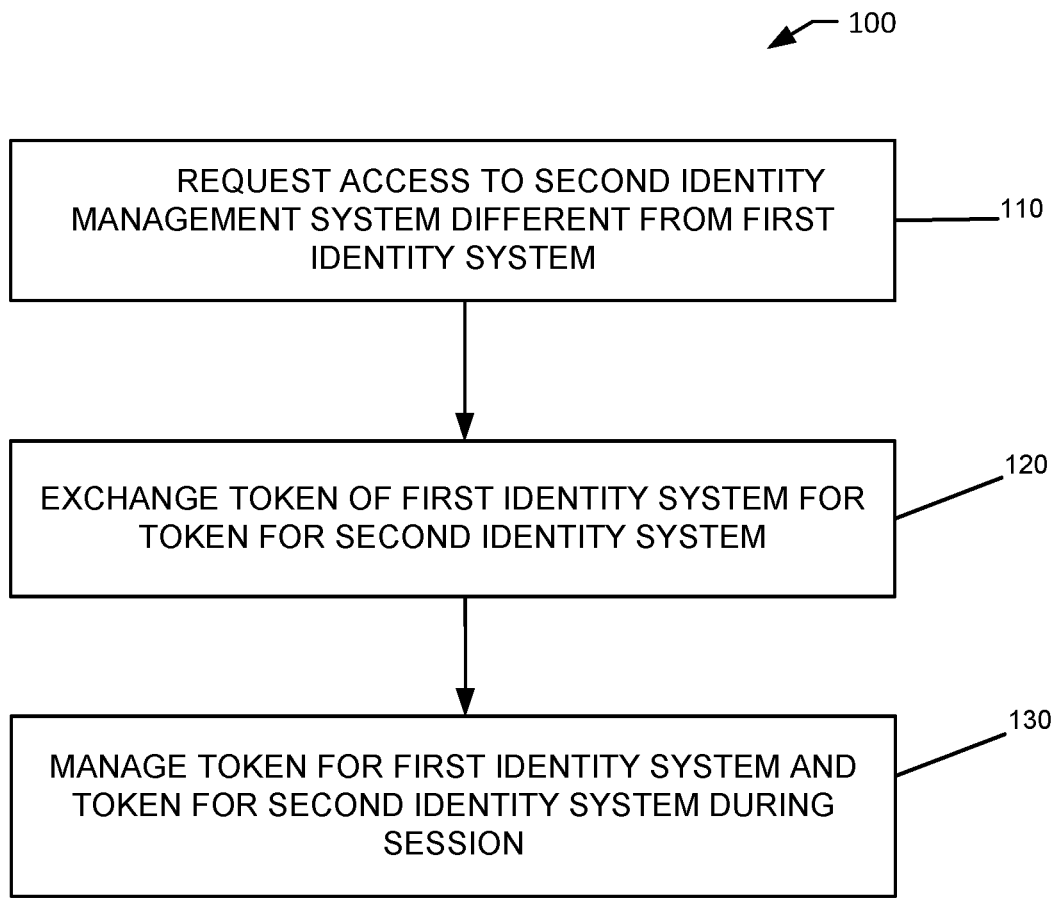
FIG. 1 illustrates a general overview of a method for exchanging tokens, in accordance with some example embodiments.

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others.

In the cloud environment, an identity management system is generally provided by the cloud service provider to control user access to resources provided or used by a cloud service. Typical services or functions provided by an identity management system include, without restriction, single sign-on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login, password, etc. The same customer thus has two separate sets of credentials for the two accounts. This results in an unsatisfactory customer experience. Additionally, having two separate identity management system also creates obstacles for interactions between SaaS/PaaS and IaaS services.

Further, each of these different platforms comply with different specifications or rules. The specifications for each of these platforms cannot be easily changed. Some user may interact with only one platform and other users may interact with both platforms. Therefore, some users may not need to communicate with both platforms, and some users may need to communicate with both platforms. However, if a user is interacting with both platforms, an example embodiment provides a solution to seamlessly interact between the different platforms. Therefore, an example embodiment complies with standards for each of the identity systems, while allowing an entity to access the different identity systems.

For purposes of this application, and as an example, the two platforms are referred to as Identity and Access Management System (IAM) and Identity Cloud Service (IDCS). These names and terms are however not intended to be limiting in any manner. The teachings of this disclosure apply to any situation where two (or more) different identity management systems are to be integrated. The identity management systems or platforms to be integrated may be provided by one or more CSPs.

In certain embodiments, an integrated identity management platform (referred to as Integrated Identity Management System (IDMS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration however is technically very difficult for several reasons. The two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions— those that don't have "approved" characteristics as defined by an organization's security policies. On the other hand IDCS may be a role-based access control (RBAC) system which is a policy-neutral access-control mechanism defined around roles and privileges. The components of RBAC such as role-permissions, user-role and role-role relationships make it simple to perform user assignments.

As yet another reason, the authentication and authorization frameworks or workflows (e.g., types of tokens that are used, different authentication frameworks such as OAUTH, etc.) used by the two platforms may be different. This is just a small sampling of reasons why providing an integrated solution is technically very difficult.

I. Overview of Method—Exchanging Tokens

FIG. 1 illustrates a general overview of a method 100 for exchanging tokens, in accordance with some example embodiments. The method 100 shown in FIG. 1 can be performed by a token exchange system of an Integrated Identity Management System (IDMS). The token exchange can be performed to exchange a bearer token for a proof of possession (PoP) token, or to exchange a PoP token for a bearer token. In an example embodiment, a token for a first identity system can be exchanged to obtain a different type of token for a second identity system.

At step 110, a request is received from a first entity of a first identity system to access a resource of a second identity system. The first entity in the first identity system has an access token for the first identity system. However, the second identity system requires an access token that is different for the second identity system. An entity can also be referred to as a user or a client. An entity can include any component, application or service that would like to access features of the IAM system or IDCS system.

For example, a SaaS or a PaaS service on a first identity system (e.g., IDCS) would like to access a storage service on a second identity system (e.g., IAM). As another example, a storage service on the second identity system (e.g., IAM) may want to communicate with functions of a SaaS or PaaS of the first identity system (e.g., IDCS). As another example, an application programming interface (API) key of an IAM system may want to obtain a token of an IDCS system.

Alternatively, an IDCS service having an IDCS token may want to communicate with an IAM system to obtain IAM resources for a product.

In order for the entity to obtain an access token for the second identity system, the entity could log into the second identity system and establish credentials for the second identity system. After establishing credentials for the second identity system, the entity is provided with an access token for accessing the second identity system. However, this is burdensome and inefficient to require the entity to establish credentials for the second identity system. Specifically, it is burdensome to require the entity to establish credentials for each identity system the entity accesses. Requiring the entity to obtain credentials for each identity system also interrupts a workflow. Given a number of users who access both identity systems, this becomes cumulatively burdensome.

Therefore, in accordance with an example embodiment, at step 120, a token exchange system of an Integrated Identity Management System (IDMS)) can exchange the access token of the first identity system to an access token for the second identity system. An entity can then access resources in both the first identity system and the second identity system without having to enter credentials for each identity system.

At step 130, the token exchange system of the Integrated Identity Management System (IDMS)) continues to manage the access token for the first identity system and the second identity system throughout the entity's session with the first identity system and the second identity system. A session can refer to the period during which the user is accessing the first or second identity system. A user can log into the first or second identity system via a sign on session on a browser. The access tokens can continue to be used based on the existence of the browser session. For example, a browser session could be 12 hours, however, this is merely an example.

Therefore, an example embodiment allows for seamless interoperation for accessing features of a first identity system and a second identity system during a session.

The tokens can be session based. That is, while a user is authenticated in a session, the tokens can continue to be used. The tokens can also be browser based. If a user is logging into a browser using a sign on session, the length that the tokens can continue to be used can be based on the browser session.

II. Token Exchange System

Figure 2:
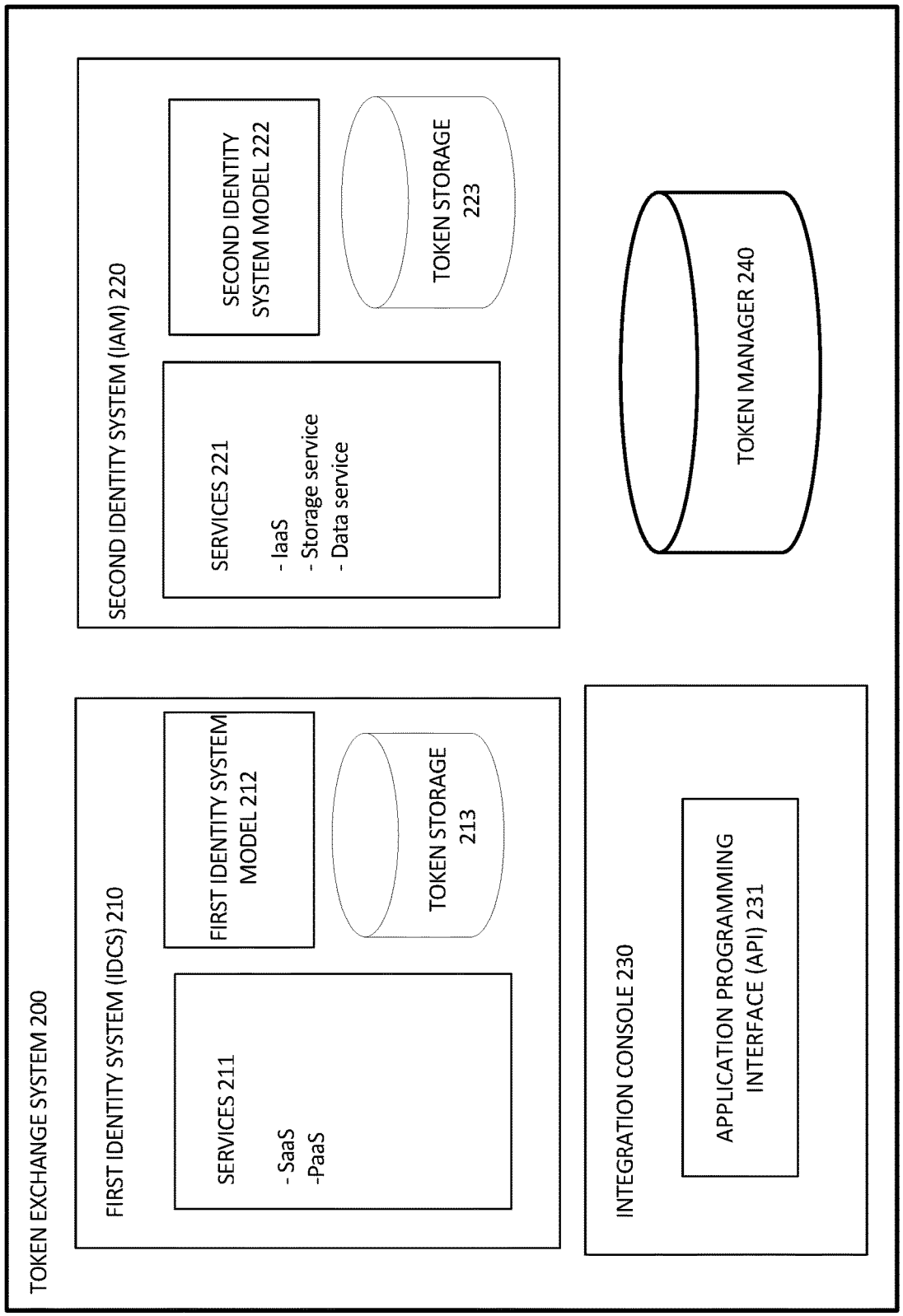
FIG. 2 illustrates a block diagram of a token exchange system for exchanging tokens, in accordance with some example embodiments.

FIG. 2 illustrates a block diagram of a token exchange system 200 for exchanging tokens, in accordance with some example embodiments.

The token exchange system 200 can be part of an Integrated Identity Management System (IDMS)). The token exchange system 200 interfaces with a first identity system 210 and a second identity system 220. The token exchange system includes one or more processors and one or more memories for storing data such as token information.

The first identity system can correspond to an IDCS and the second identity system can correspond to an IAM. The first identity system 210 can include services 211, a first identity system model 212, and a token storage 213. The services 211 can include, for example, SaaS and PaaS services. The second identity system 220 can include services 221, second identity system model 222, and token storage 223. The services 221 can include, for example, IaaS, storage services, and data services.

A first identity system 210 refer to the IDCS system. The tokens that are associated with an IDCS system are bearer tokens. Bearer tokens can also be referred to as OAuth tokens, OAuth access tokens, or access tokens. Bearer tokens can follow OAuth specifications. The IDCS access tokens can be a JSON Web Token (JWT). The tokens associated with an IDCS system can be referred to as application principals or credentials. An end user can include an authorized user who is accessing the IDCS system.

The second identity system 220 can refer to an IAM system. An IAM system can include tokens. In this specification, the second identity system refers to the IAM system. The tokens that are associated with an IAM system are proof of possession (PoP) tokens. Proof of possession (PoP) tokens can follow the Internet Engineer Task Force (IETF) specifications.

Tokens associated with an IAM system can be referred to as a security principal or instance principal. An example security principal can include a service principal session token (SPST). An SPST token can be a JSON Web Token (JWT). The tokens can be user based or resource based. A user based token can be associated with a user, end user, or customer of the IAM system. An end user can include an authorized user who is accessing the IAM system.

The first identity system model 212 can include model information for the first identity system. Second identity system model 222 can include model information for the second identity system. The tokens or principals for the IDCS system are different and follow different standards and models than the tokens or principals for the IAM system. Further, tokens from the IDCS system serve a purpose for the IDCS system whereas IAM tokens service a purpose specific to an IAM system. Therefore, each identity systems stores a model identifying the specifications needed for the identity system to operate correctly.

The token storage 213 and token storage 223 can store access tokens associated with the identity system. An access token can be a credential that can be used by an application to access an API. The access token can be an opaque string, JSON Web Token (JWT), or non-JWT token. An access token can be used to inform an API, such as API 231, that the bearer of the token has been granted delegated access to the API and is requesting a predetermined set of actions. The actions that are requested are actions that are within the scope of the bearer of the token.

Token storage 213 can store, for example, a bearer token. A bearer token is a token that can be used based on ownership. That is, the entity in possession of the bearer token can use it. An entity in possession of a bearer token can use the bearer token directly without needing additional information, such as a key. Bearer tokens use HTTPS for communication to prevent man-in-the-middle attacks. Further, bearer tokens use an exact specified address to send responses. Use of a specific address avoids misbehaviors that can be caused by extra parameters in a URL, such as a malicious redirect.

Token storage 213 and 223 can also store an ID token. An ID token is an artifact that proves that successful authentication occurred. An ID token can be a JWT that contains user profile attributes. The user profile attributes can be represented in the form of claims. ID tokens can be consumed by an application and used to obtain user information such as username and email. The user information can be used for user interface (UI) displaying purposes.

Token storage 223 can store, for example, a Proof-of-Possession (PoP) token. A PoP can refer to crypto mechanisms that mitigate the risk of security tokens being stolen and used by an attacker. A PoP token cannot be so easily used by attackers to obtain the PoP token. In order to use the PoP token, both the token itself and access to a key associated with the token is needed. The key can be a private key associated with the entity. PoP tokens can also be referred to as Holder of Key (HoK) tokens. Security tokens in IAM are JWTs that contain a public PoP key as a JSON Web Key (JWK) to provide the application means to security accessing an API.

The token exchange system 200 also includes an integration console 230 and a token manager 240. The integration console 230 can include an application programming interface 231. API 231 of integration console 230 can be used to request a token exchange and perform a token exchange between the different identity systems.

The token manager 240 of the token exchange system 200 manages the tokens that have been exchanged for an entity. The token manager 240 manages the tokens that allow an entity to communicate with the first identity system and the second identity system. Since tokens for communicating with the first identity system and the second identity system are maintained, forward and backward compatibility is maintained. That is, the entity can access features of the second identity system while continuing to be able to access features of the first identity system. An IAM entity will continue to have an identity for IAM in addition to IDCS, and vice versa.

A. Integration Console and Token Manager

Figure 3:
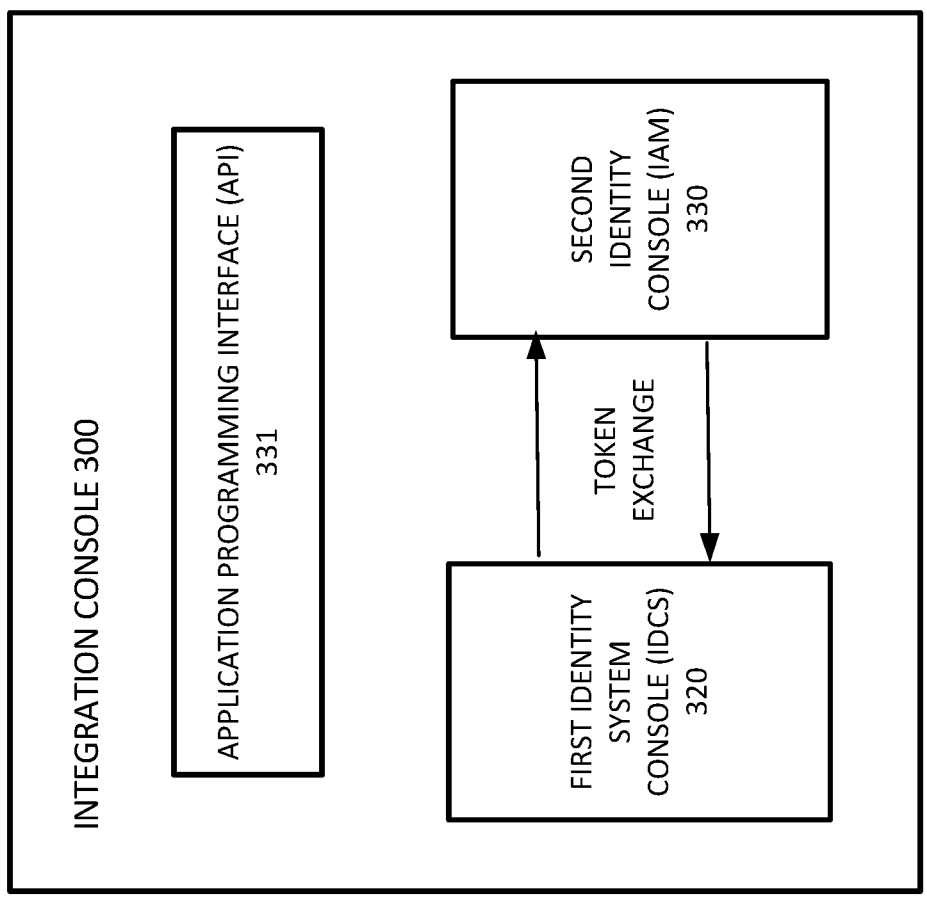
FIG. 3 illustrates a block diagram of an integration console for exchanging tokens, in accordance with some example embodiments.

FIG. 3 illustrates a block diagram of an integration console 300 for exchanging tokens, in accordance with some example embodiments. The integration console 300 can correspond to integration console 230 shown in FIG. 2. The integration console can act as an exchange and storage service.

The integration console 300 is used to perform the exchange of tokens between the first identity system and the second identity system. The integration console 300 can include an API 331, a first identity system console 320 and a second identity console 330.

An entity can access, for example, the first identity system console 320 on the integration console 300 in order exchange a token of the first identity system for a token of the second identity system.

For example, a user can log into the first identity system console 320 console to access the integrated identity management system. The integration console 300 is a cloud service console and allows user to access cloud services. The integration console offers a variety of API as service offerings. A user can use the API service offerings to initiate a cloud service.

In the backend, there can be code for the token exchange. The code can be used by the integration console 300 to convert the token to the appropriate token for the system. The integration console 300 performs the token exchange. Logic can be written so that the integration console 300 can call the appropriate token exchange. The integration console can also act as a storage service.

Further, an entity can access, for example, the second identity system console 330 on the integration console 300 in order exchange a token of the second identity system for a token of the first identity system.

The second identity system console (IAM) 330 may have a token that was generated by the IAM. However, some of the API's that are offered may be related to IDCS. Therefore, the second identity system console (IAM) 330 can perform a token exchange with the first identity system console (IDCS) 320. The integration console 300 acts as a portal for customers to interface with the IDCS system and IAM system in an integrated manner. The console can interface with different services of identity management systems.

The integration console helps customers develop different types of integrations between various services provided by the IDCS system and IAM system.

III. Method for Obtaining Token

Figure 4:
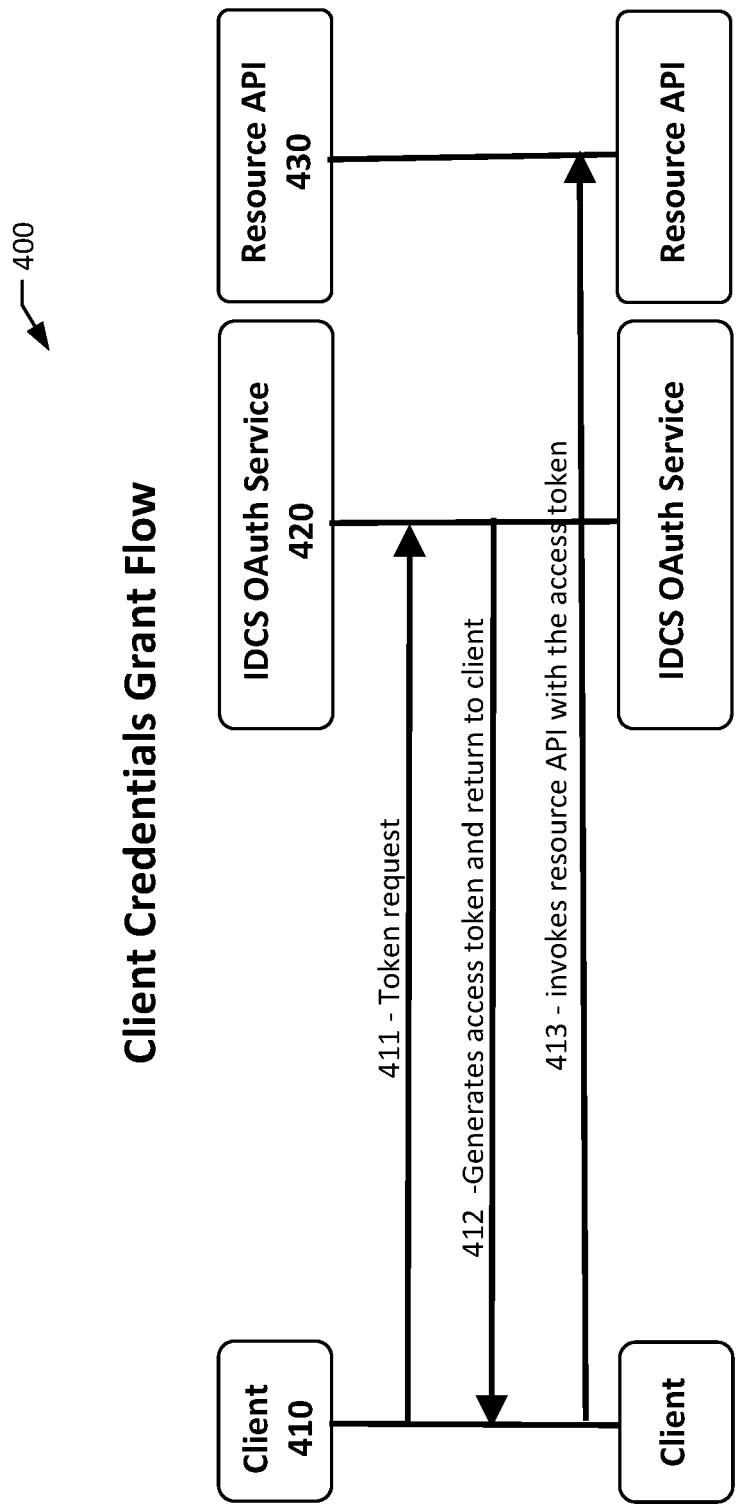
FIG. 4 illustrates a sequence diagram for obtaining an access token.

FIG. 4 illustrates a sequence diagram 400 for obtaining an access token. In the example shown in FIG. 4, a client of the IDCS system is requesting an access token for the IDCS system.

The diagram shown in FIG. 4 illustrates the interaction between a client 410, an IDCS OAuth Service 420 and a Resource Application Programming Interface (API) 430. In the example shown in FIG. 4, the client 410 of an IDCS system obtains an IDCS access token.

At step 411, the client 410 makes a token request to the IDCS OAuth service 420. The client can be an application, and the application needs an access token in order to access features of the IDCS system. The application has its own credentials and it will make some requests. For example, it will make a request for an access token. In making the request, the application sends a payload, and in turn it will received a token (e.g., access token).

At step 412 the OAuth service 420 generates access token to the IDCS system for the client and returns the access token to client. In an IDCS, an access token can be a bearer token.

At step 413, the client, who now has an access token, can invoke a Resource API using the access token. Therefore, the client now has the credentials to interact with the resources of the IDCS system. The client can access the resource API since they now have an access token.

The methods for obtaining an access token can vary based on specifications. In the example shown in FIG. 4, the method for obtaining an access token is based on various OAuth specifications or OAuth standards. Further, methods for obtaining access tokens can be based on Open ID Connect (OIDC) specifications.

This is merely an example for obtaining an access token and various methods can be used for obtaining an access token. The example shown is for obtaining an IDCS token. However, a user can also obtain an IAM token.

It is inconvenient for a user to obtain access tokens for each system the user would like to access. A user does not want to have to obtain an IDCS token and a separate IAM token when a product they are working would like to access features of an IDCS system and an IAM system. Further, a client does not want to go through the process of obtaining separate access tokens and managing their access tokens for different identity systems.

Therefore, if a user already has an access token for one type of identity system (e.g., first identity system), the access token for the first identity system can be exchanged for a token for a different identity system (e.g., second identity system).

IV. Exchanging PoP Token for Bearer Token

If a user is logged in an IAM application and the user has a PoP token, and the same customer tries to access an application that is controlled by an IDCS system, instead of having to do a separate log-in again, an example embodiment allows the customer to obtain a bearer token based on the existing PoP token, and vice versa. Example embodiments allow an entity to obtain a token for a different identity system without the entity being aware that the exchange is occurring. The user can seamlessly access features of different identity systems. Further, example embodiments enhance interoperability between the different identity systems.

Figure 5:
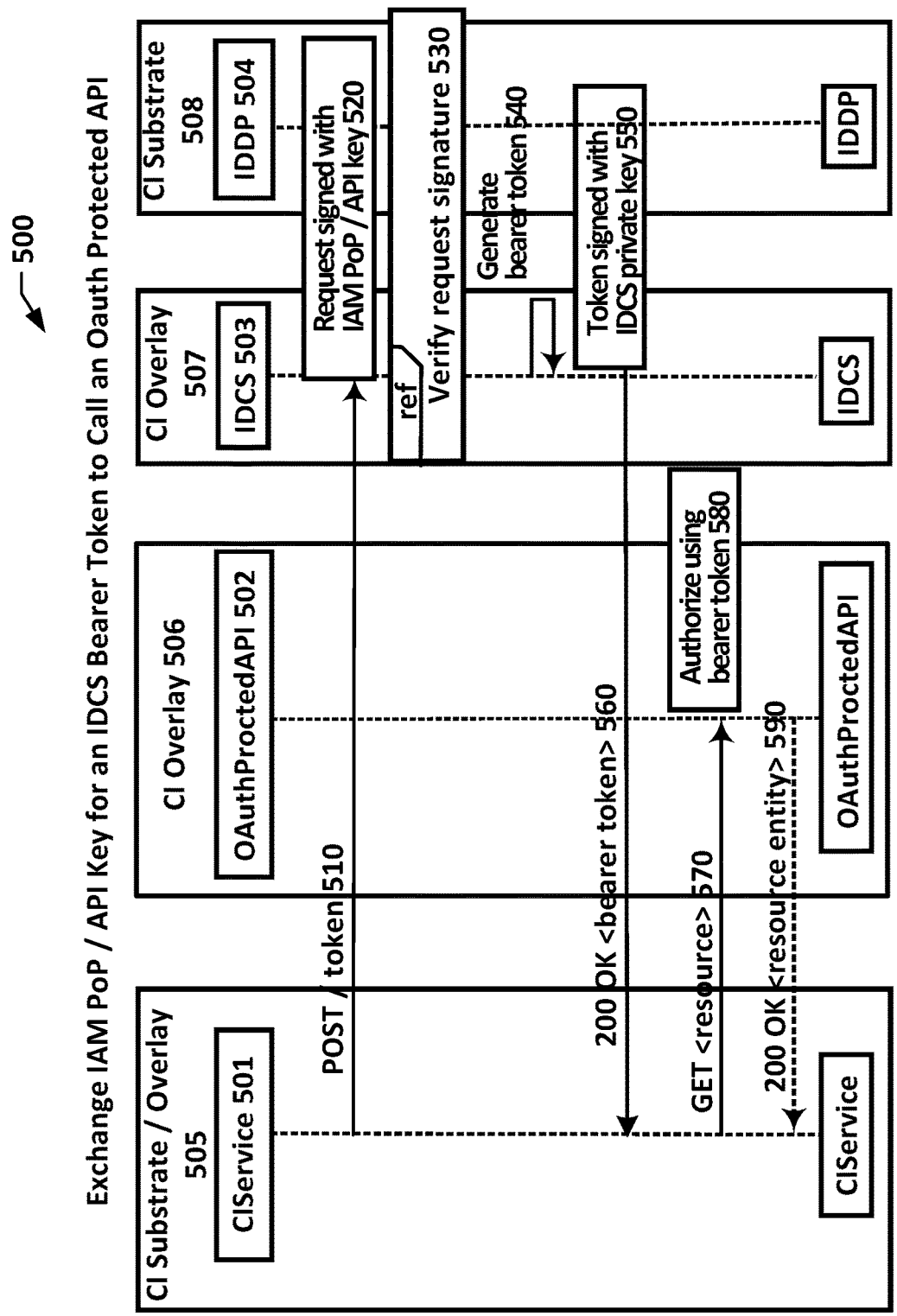
FIG. 5 illustrates a sequence diagram for exchanging a proof of possession token for a bearer token, in accordance with some example embodiments.

FIG. 5 illustrates a sequence diagram 500 for exchanging a Proof-of-Possession (PoP) token for a bearer token, in accordance with some example embodiments.

An entity having a PoP token can access resources of an IAM system. However, in order to access resources of an IDCS system, the entity will need a bearer token. FIG. 5 illustrates how a PoP token for the entity is exchanged for a bearer token for the IDCS.

FIG. 5 illustrates the interaction between a cloud infrastructure service 501, an OAuth protected API 502, an IDCS 503 and an IDDP (identity data plane) 504. The IDDP 504 can be a token exchange endpoint that can contain all identity data in memory and the data in the memory is not shared. The cloud infrastructure service 510 can be located on a cloud infrastructure substrate or overlay 505. The OAuth protected API 502 can be located on a cloud infrastructure overlay 506. The IDCS 503 can be located on a cloud infrastructure overlay 507. The IDDP 504 can be located on a cloud infrastructure substrate 508.

In the example shown in FIG. 5, the entity has an TAM Proof-of-Possession (PoP) token and their PoP token is exchanged for a bearer token for an IDCS system. For example, the user may have an authenticated PoP token and the user is performing operations in the TAM system. The user is authenticated and they have logged into the TAM system. In a same session, the user can obtain a token for the IDCS system. A user can refer to a product, an application or service of an application that would like to access features of the IDCS system. A product or application can include products or applications that interact with an TAM or IDCS system. Applications can also include web applications.

In the example shown in FIG. 5, an TAM service, such as IaaS, is trying to access an IDCS service, such as a PaaS. The TAM service has an TAM token. However, in order to access a PaaS service of the IDCS system will need an IDCS token. Therefore, the TAM service will request an IDCS token (e.g., bearer token for IDCS).

If a service has an TAM token, in order to access a PaaS service (IDCS), the service can request an IDCS token. The service can send a request to IDCS. The request is signed with an TAM PoP/API key. The IDCS can then verify the request. If the request is valid, the IDCS can generate a bearer token for the cloud infrastructure (CI) service to use in IDCS. The IDCS signs the generated bearer token with the private key of the IDCS. The verified bearer token signed by the IDCS can be used to make calls to the IDCS API.

The steps shown in FIG. 5 can be initiated when a user accesses an TAM console 330 on the integration console 300.

At step 510, a request is made from an TAM service (cloud infrastructure service 501) to an IDCS 503 to post or request a token.

At step 520, an cloud integration (CI) service 501 either in the substrate or the overlay issues a signed token exchange/token request to IDCS in the overlay.

At step 530, the IDCS OAuth service (IDCS 503) verifies the request signature. Each application can be assigned an initial key, such as a user name and/or password. The request is signed with an IAM Proof-of-Possession (PoP) and API key. The signature of the request is verified by the IDCS and the IDCS can validate the request.

At step 540, the computing system generates an access token based on the type of key included in the signature. In the example shown, a bearer token is generated. The IDCS generates an IDCS compliant token.

At step 550, the IDCS 503 signs the token with the private key of the IDCS.

At step 560, the signed bearer token is sent to the cloud infrastructure (CI) Service. The bearer token that is signed is returned to the caller service.

At step 570, the CI service 501 requests to get a resource. The CI service will use the access token to issue a request to an OAuth protected API. The CI service can use the generated token to call the API.

At step 580, the OAuthProtected API 502 can authorize the request using the bearer token.

At step 590, the resource entity can be obtained as a result.

A service of an IAM identity system having an IAM PoP token can exchange its IAM PoP token for a IDCS token (e.g., bearer token) and the IAM service can access services of the IDCS system.

Therefore, when a service tries to communicate with any other CI API, the request can be signed with the user's private key and the token is attached. Other services can reach out to the IDDP (identity data plane) to request the public key in order to verify that the entity actually signed the token.

IV. Exchanging Bearer Token for a PoP Token

A resource within a particular tenancy or logical container may at times request access to another resource within the tenancy/logical container, where the other resource is protected. Like human users, instances can have identities assigned to them. Within an identity and access management (IAM) service provided as part of a cloud platform, such entities are sometimes referred to as principals. A principal is an entity that can be permitted, based on the identity of the principal, to interact with other resources in a cloud computing environment (e.g., to perform a read, a write, or a service-related operation).

Figure 6:
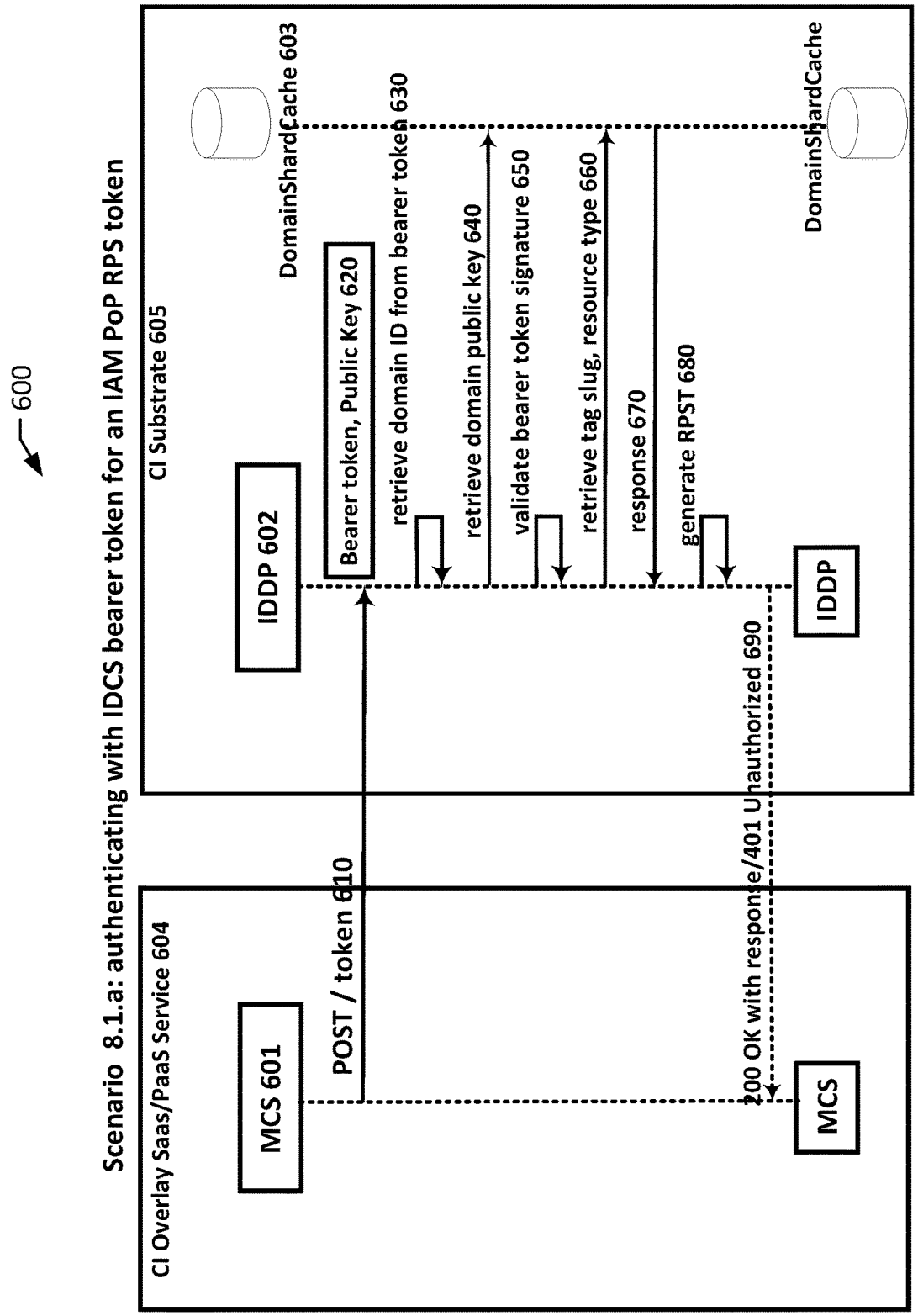
FIG. 6 illustrates a sequence diagram for exchanging a bearer token for a proof of possession token, in accordance with some example embodiments.

FIG. 6 illustrates a sequence diagram 600 for exchanging a bearer token for a Proof-of-Possession (PoP) token, in accordance with some example embodiments.

FIG. 6 illustrates the interactions between a management cloud service (MCS) 601, an IDDP (identity data plane) 602 and a domain shared cache 603. The management cloud service 601 can be located on a cloud infrastructure SaaS/PaaS service 604. The IDDP 602 and the domain shared cache 603 can be located on a cloud infrastructure substrate 605. The IDDP 602 can be a token exchange endpoint.

In the example shown in FIG. 6, an IDCS service, such as SaaS and PaaS, which has an IDCS token (e.g., bearer token) would like to access a service of an IAM system. The user is authenticated and they have logged into an IDCS system and have obtained an IDCS token. In a same session, the user can obtain a token for the IAM system. A user can refer to a product, an application or service of an application that would like to access features of the IAM system. A service of the IAM system can include IAM data services and storage services. PaaS and SaaS services of the IDCS can make sure of any data services of the IAM using the IAM generated token.

At step 610, a request is made from a SaaS/PaaS Service to post a token to IDDP 602. The request includes a bearer token and a public key. One bearer token can be used for all accesses made by the entity during a session.

At step 620, the bearer token and the public key are identified.

At step 630, a domain ID is retrieved from the bearer token.

At step 640, a public key of the domain is obtained from a domain shared cache.

At step 650, the signature of the bearer token is validated.

At step 660, a tag is retrieved and a resource type is identified.

At step 670, a response is provided to the IDDP 602.

At step 680, a resource principal session token (RPST) is generated. Although the example is shown with respect to obtaining a resource principal session token, additional embodiment can be directed to obtaining a service principal session token (SPST).

At step 690, it is determined whether the request is authorized to proceed.

Although the example described above is with respect to a service, applications can also be used to perform the exchange.

Therefore, an example embodiment integrates the different mechanisms so that users will have a seamless and unified experienced when accessing aspects of different identity systems. End users and customers can include users of the IAM and IDCS systems. An end user's operation of systems are not affected while the token exchange occurs. A user can thus seamlessly operate between an IAM and IDCS system using the generated tokens.

Example embodiments address problems faced by users when accessing components of different systems, such as different identity management systems. The user can alternate between two different identity management system. The user experience is enhanced and seamless since they do not have to login to each system separately.

V. Method for Exchanging Tokens

Figure 7:
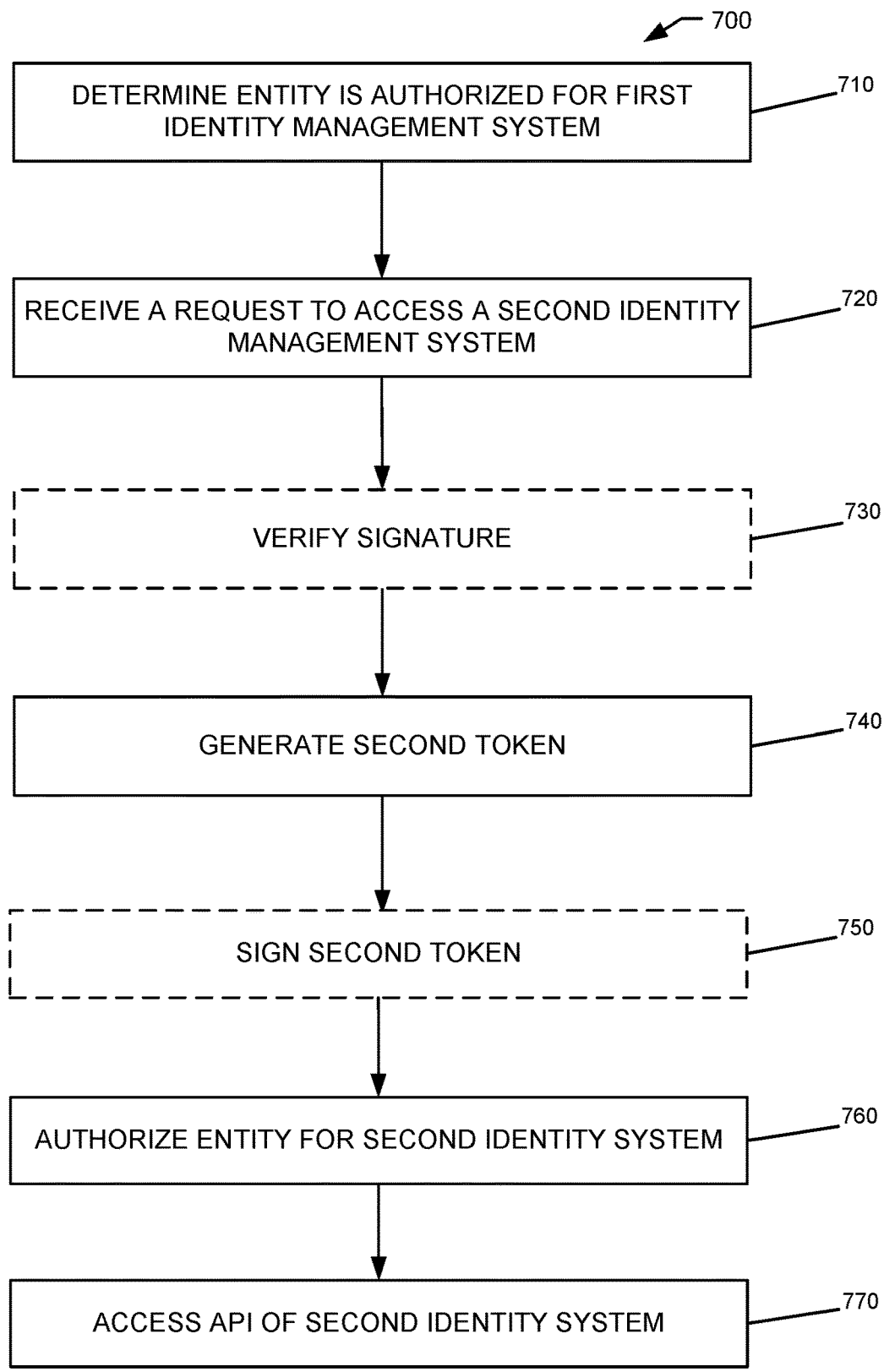
FIG. 7 illustrates a method for exchanging tokens, in accordance with some example embodiments.

FIG. 7 illustrates a method 700 for exchanging tokens, in accordance with some example embodiments.

At step 710, the token exchange system can determine that an entity is authorized to access a first identity system. The entity can be an application.

At step 720, the token exchange system an receive a first request by the entity to access a second identity system. The first request can include a bearer token and a public key.

At step 730, the token exchange system can verify that the token is valid. The token can be determined to be valid if the signature on the request is valid.

At step 740, the token exchange system can generate a second token for the second identity system based on the first token for the first identity system.

At step 750, the token exchange system can sign the second token with the private key of the entity to generate a second signed token.

At step 760, the computing system authenticates the entity to access the second identity system based on the second signed token. The token exchange system can verify that the entity is the entity that signed the bearer token based on the public key.

At step 770, the token exchange system can authorize an entity to access an application programming interface of the second identity system using the second token.

The examples above generally describe token exchange. However, token exchanges can be performed by specific entities, such as applications.

VI. Applications as Resource Principals or Service Principals

An application may not be able to interact with other resources because the application does not have an identity. Applications may follow an OAuth authentication model which use bearer tokens. The application is part of a domain and it can therefore, interact with elements in the domain. However, an application may not be capable of interacting with elements outside of its domain.

IAM Application programming interfaces (API's) may only accept a connection from a resource or a service. If the entity is not a resource or a service, then the entity cannot communicate with the IAM API. IAM API's depend on getting a signed request where the request is signed by a private key and only the requestor has the private key.

An example embodiment converts the bearer token identity that is possessed by an application, such as a SaaS application, a PaaS application or a fusion application (FA) and the token exchange system can exchange the bearer token identity for a resource principal session token (RSPT) identity, which is accepted by an API in IAM. The RSPT identity uses a PoP token. The bearer token of the application is converted to a PoP token, which allows the application to act as a resource principal or a service principal.

In the past, an application in one domain can only access resources within that domain. However, now the application can be given a resource principal identity or a service principal identity. If the application is updated to a principal identity, it can manage data of all the users in the domain.

Once the application has a resource principal session token identity, the entity can be part of dynamic groups. The entity can be assigned various privileges and the entity can be treated as a resource principal. The example described is with an application having an identity for a resource principal, but the application could also be given an identity of a service principal.

As a resource and/or service principal, the application would have more scope and more privileges, and can be part of dynamic groups.

The application having a bearer token is then capable of acting as a principal (i.e., an entity that can access a resource or a service). The application is authenticated/authorized prior to the accessing the IAM.

In an example embodiment, a bearer token, which a SaaS, PaaS, or Fusion Application (FA) have, can be exchanged for a resource principal session token identity. Once the application has a resource principal session token identity, the application can be part of a dynamic group and can be assigned any privilege and can be treated as a service The application can be treated as a service principal and not just a resource. The application has more scope and more privileges.

A. Sequence Diagram—Application to Principal

In IDCS, an application can have a stripe. A stripe can also be known as a tenancy or an account. Within this stripe, a user has rules for managing the application. Within the tenancy there can be different rules. For example, there may be a financing application in one stripe which has certain rules for managing the financing app. Further, another group in another stripe may have a Human Resources (HR) application and may have rules for managing the HR application. Further, there may be a database application, and there are rules for accessing the database. However, if an enterprise, such as a company, has more than one stripe, the applications within the stripes cannot communicate with each other. That is, there is no cross tenancy or cross stripe communication. These systems use bearer tokens.

Figure 8:
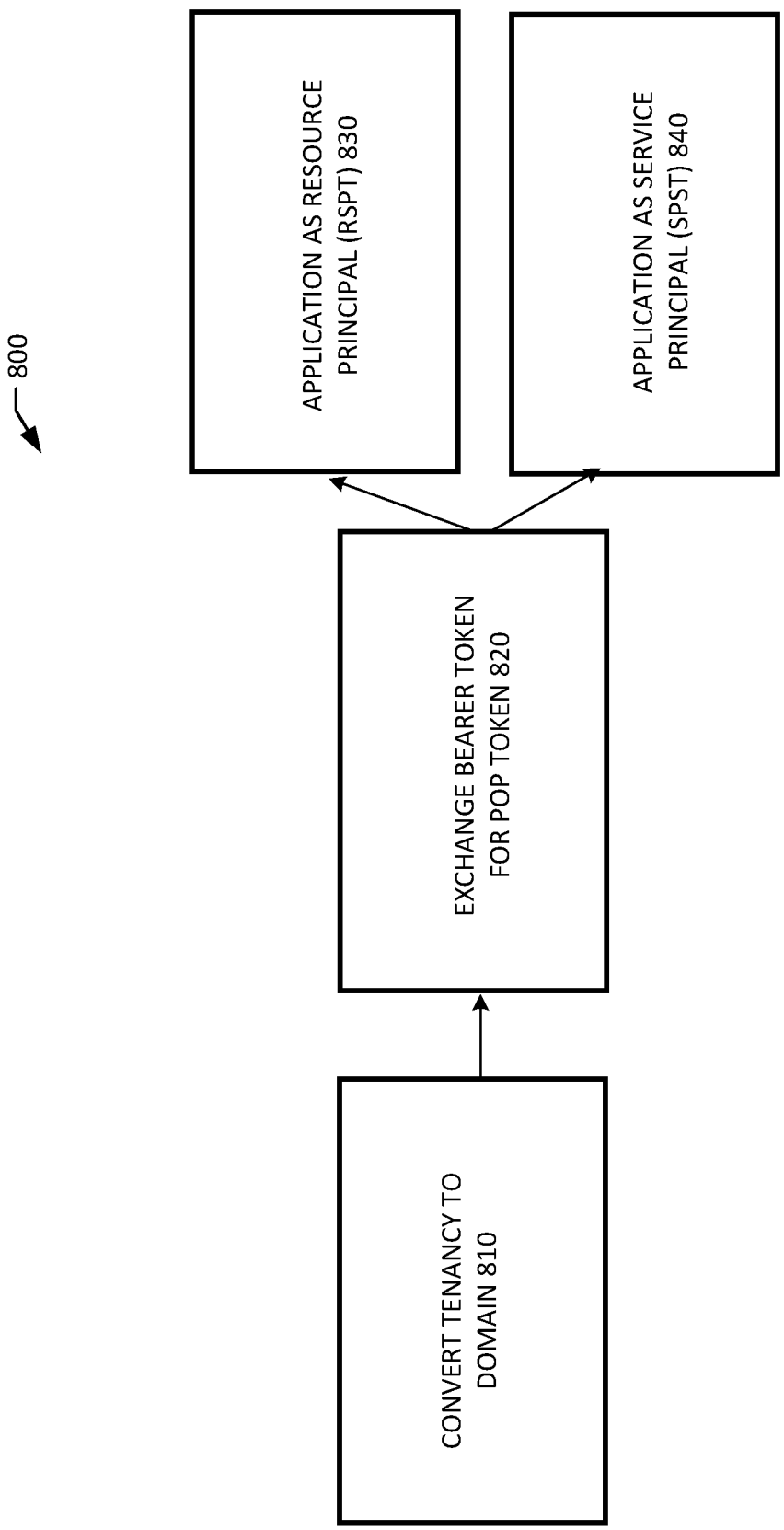
FIG. 8 illustrates a sequence diagram for converting an application to a resource principal or a service principal, in accordance with some example embodiments.

FIG. 8 illustrates a sequence diagram 800 for converting an application to a resource principal or a service principal, in accordance with some example embodiments.

As shown in FIG. 8, at step 810, an application tenancy is converted to a domain. A single tenancy is shown, however a several tenancies can be converted to several domains.

At step 810, bearer tokens of applications are exchanged for PoP tokens. Since the applications now use PoP tokens, the applications are allowed to act as a resource principal as shown in step 830 or as a service principal as shown in step 840.

When an application acts as a resource principal, it is capable of acting as a resource in IAM. When an application as a service principal, it is capable of acting as a service in IAM.

B. Cross Communication in IDCS

Figure 9:
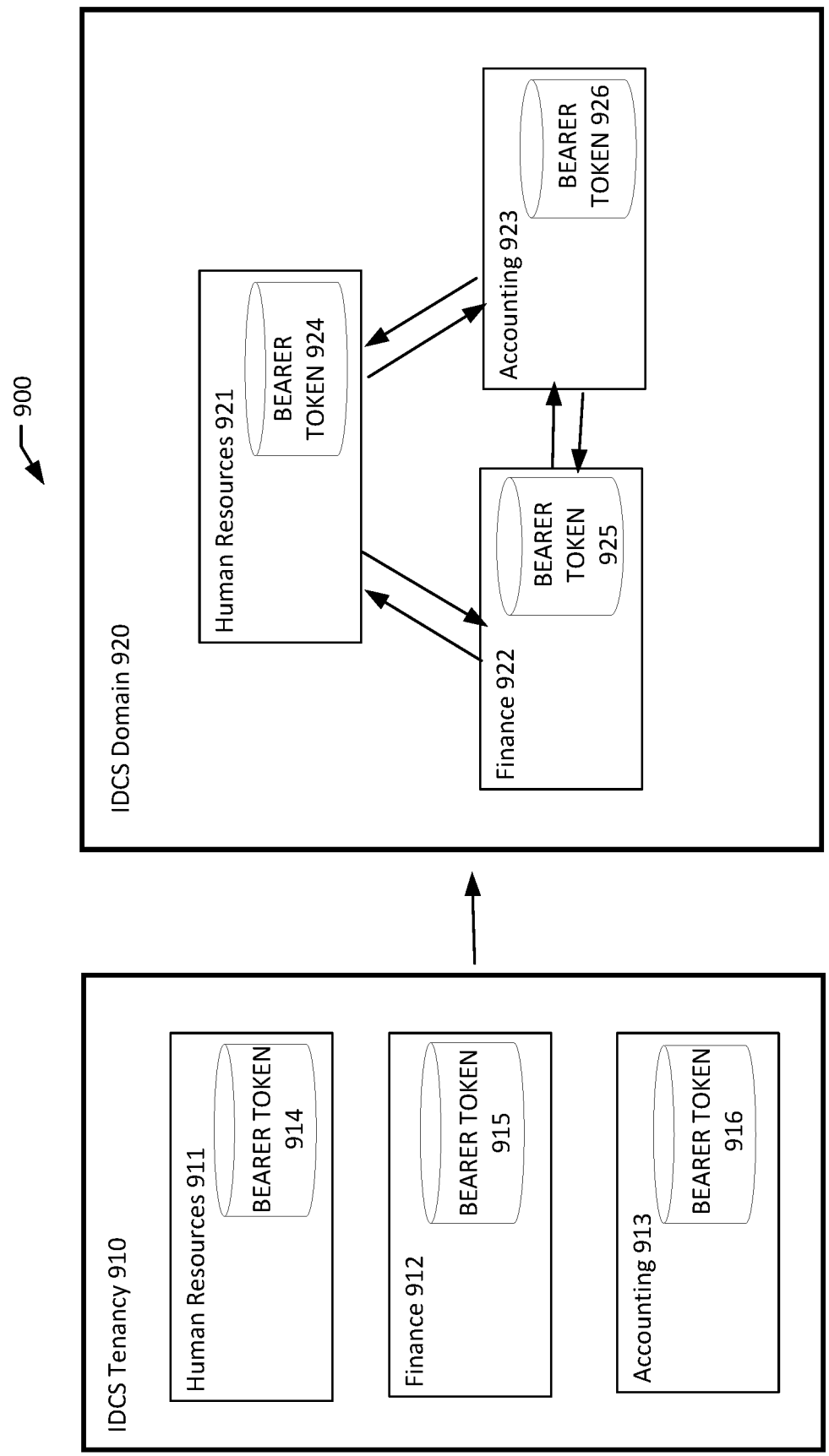
FIG. 9 illustrates a block diagram for cross communication in an IDCS, in accordance with some example embodiments.

FIG. 9 illustrates a block diagram 900 for cross communication in an IDCS, in accordance with some example embodiments.

As shown in FIG. 9, applications can be in a tenancy 910 in IDCS. A tenancy can also be known as a stripe or an account. As shown in FIG. 9, each department in a company, such as human resources, finance and accounting, can each have their own tenancy (human resources 911, finance 912 and accounting 913). The tenancies can operate using bearer tokens. The tenancies shown in FIG. 9 are for purposes of example, and there can be various other tenancies. The human resources tenancy 911 can include bearer token store 914, finance tenancy 912 can include bearer token store 915, and accounting tenancy 913 can include bearer token store 916.

As shown in FIG. 9, each tenancy operates independently of the other tenancies. That is, users in human resources tenancy 911 can only access information within human resources tenancy 911, users in finance tenancy 912 can only access information within finance tenancy 912, and users in accounting tenancy 913 can only access information within accounting tenancy 913.

In order to allow tenancies to access information in other tenancies (e.g., cross communication), the tenancies are converted to domains. The IDCS tenancy 910 is converted to IDCS domain 920. With domains, the different departments can access information and communicate with information in other departments. Therefore, human resources domain 921, finance domain 922 and accounting domain 923 can communicate with each other and access information from other domains. Further, the extent each of the domains can access other domains can be based on the rights and privileges associated with each department. As shown in FIG. 9, human resources domain 921 includes bearer token store 924, finance domain 922 includes bearer token store 925, and accounting domain 923 includes bearer token store 926.

Instead of an HR tenancy that includes several users and groups, everything is now located within an HR domain. Further, the users in the domains are unique.

The domain to which an application belongs can be used to identity the privileges that are assigned to the application within the domain can be determined. As shown in FIG. 9, the application has privileges that are associated with the domain and does not have privileges outside of the domain.

C. Entity Communication with First Identity System and Second Identity System

Figure 10:
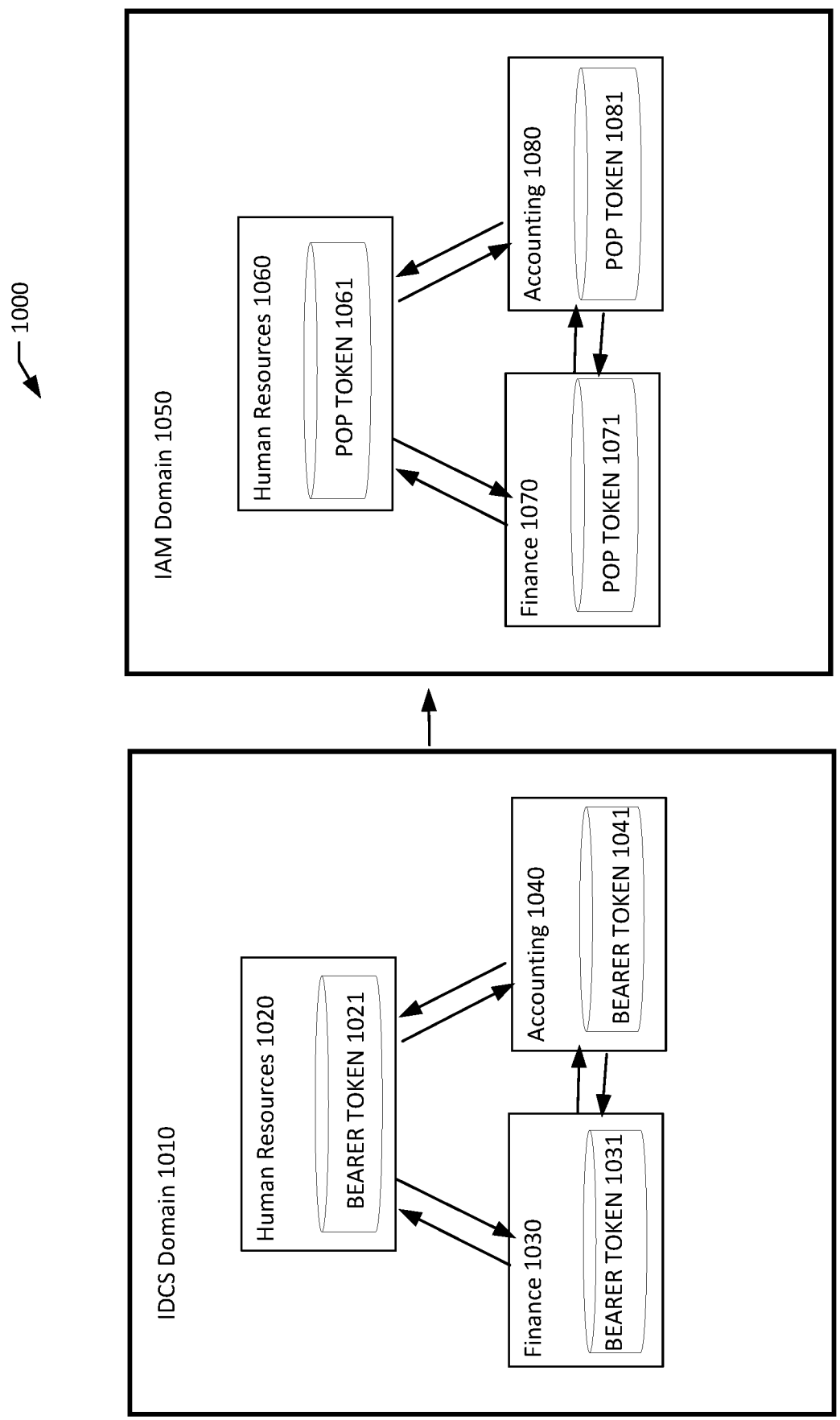
FIG. 10 illustrates a block diagram for converting applications in IDCS to resources or services in IAM, in accordance with some example embodiments.

FIG. 10 illustrates a block diagram 1000 for converting applications in IDCS to resources or services in IAM, in accordance with some example embodiments. An application in IDCS can act as a service principal or a resource principal since it exchanges its bearer token for a PoP token.

FIG. 10 shows human resources application 1020, finance application 1030, and accounting application 1040. Human resources application 1020 uses a bearer token as stored in bearer token store 1021. Finance application 1030 uses a bearer token as stored in bearer token store 1031. Accounting application 1040 uses a bearer token as stored in bearer token store 1041.

As shown in FIG. 10, the applications in the IDCS domain 1010 change their bearer tokens for PoP tokens. As shown in IAM domain 1050, the applications can use their PoP token when in the IAM domain. Within the IAM domain 1050, human resources application 1060, finance application 1070 and accounting application 1080 can now act as a resource principal or a service principal since they now have a PoP token. The PoP tokens for the applications can be stored in PoP token store 1061, PoP token store 1071 and PoP token store 1081.

As shown in FIG. 10, applications within the IDCS domain 1010 exchange their bearer tokens for PoP tokens, and are therefore capable of acting as a resource principal or a service principal within the IDCS domain 1050.

Therefore, an example embodiment allows applications that were in different stripes to communicate with each other through the use of, Proof-of-Possession (PoP) tokens.

Domain is used to described the IDCS account entity when it becomes a sub entity or sub identity within the identity itself. So a stripe in IDCS can be mapped to a domain in identity/IAM. There can be a domain for every department in the enterprise and each domain will have its own resources. Therefore, instead of stripes and tenancies, domains have been created.

D. Application Exchanging Token

1. Method—Application Exchanging Bearer Token for PoP Token

Figure 11:
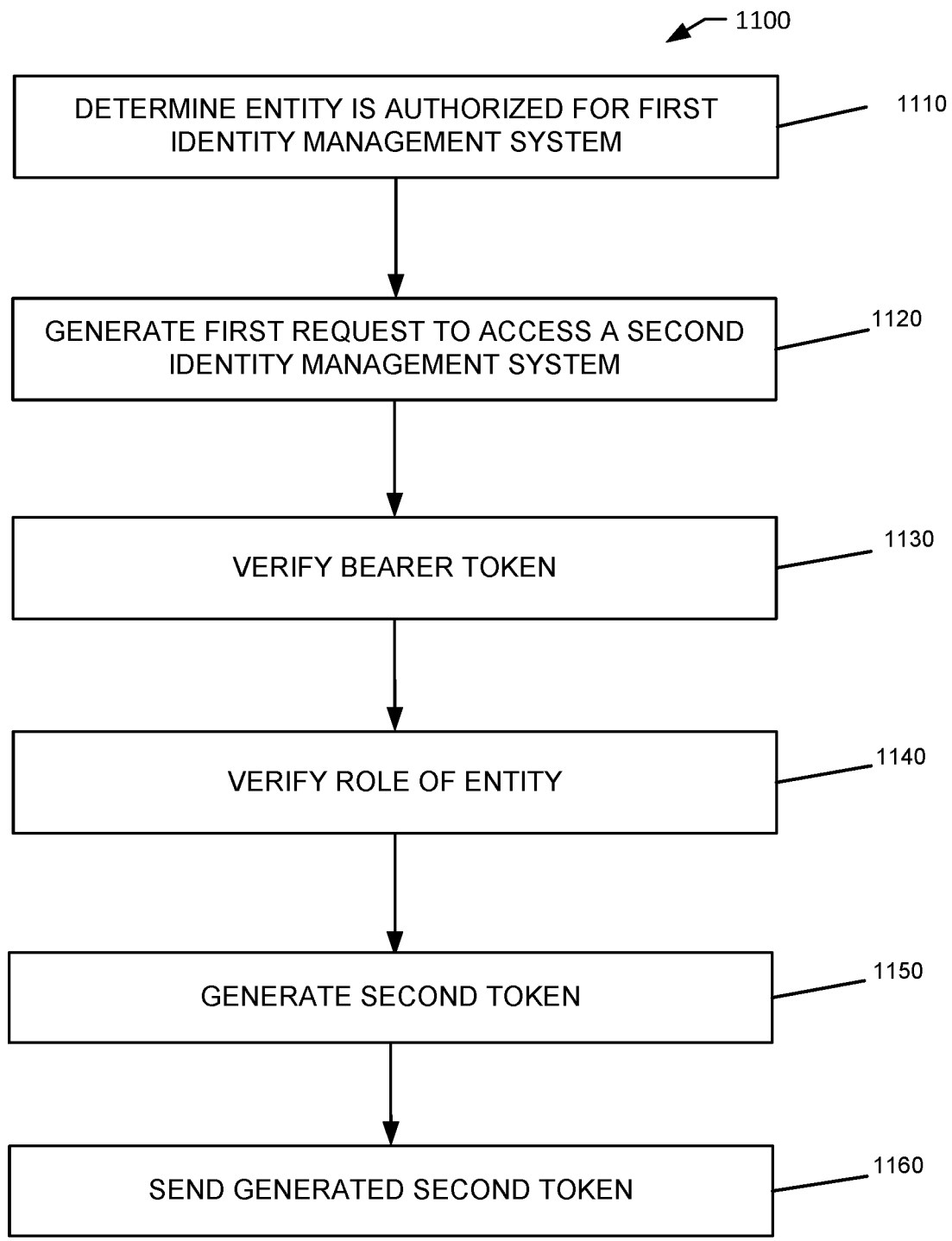
FIG. 11 illustrates a method of an application exchanging a bearer tokens for a PoP token, in accordance with some example embodiments.

FIG. 11 illustrates a method 1100 of an application exchanging a bearer token for a PoP token, in accordance with some example embodiments.

An entity can make a request to a cloud infrastructure API by generating a session key pair. The public key is stored in an identity token that other cloud infrastructure services of IAM can verify, and the entity owns the private key. The request can be signed using the private key of the entity. The token including the public key is attached with the request so that the cloud infrastructure of IAM services can verify the entity. The bearer token identity is sent as part of the request to the IAM. Other services can reach out to the entity and request the entity's public key in order to verify that the entity signed the token. Therefore, the entity can now communicate with IAM resources and services.

As disclosed in FIG. 11, a bearer token for an application is exchanged for a PoP token. For example, an application may want to communication with an API for IAM that will only accept a PoP token. Therefore, the application an initiate a process for exchanging their bearer token for a PoP token.

At step 1110, the token exchange system determines that the entity is authorized for a first identity system. The entity is authorized for the first identity system if it has the credentials to access the first identity system. The credentials of the entity are entered into the first identity system and if the credentials are correct, then the entity is authorized to access the first identity system.

At step 1120, the token exchange system can receive a request from an application for an IAM token. The application will generate a key pair (e.g., public and private key pair) and the application will provide the public key in the payload. Therefore, the request includes the application's bearer token and public key. The request is signed using the application's private key. The application does not send its private key, but uses its private key to sign the request.

The public key can be saved or store in an identity token store that the other IAM services can access to validate and verify that the application owns the private key.

At step 1130, the token exchange system can determine whether the application has a valid bearer token. When communicating with IAM, a bearer token identity can be sent as part of the request to the IAM. When an identity is being requested by an IAM entity for an IDCS identity, the bearer token identity is used to sign the request to the IDCS, but the bearer token identity is not sent with the request.

At step 1140, the token exchange system can determine the role of application and determine whether the role of the application complies with requirements for resource. The role of the application can be specified within the application. The role can identify the data that the application can access. It is verified that the application has the right role that can be converted to a resource.

The token exchange system determines whether the role of the application is sufficient to act as a resource principal. In the example described, it is determined whether the role of the application is sufficient to act as a resource principal. However, if the application would like to act as a service principal, then the token exchange system will determine whether the role of the role of the application is sufficient to act as a service principal.

Figure 13:
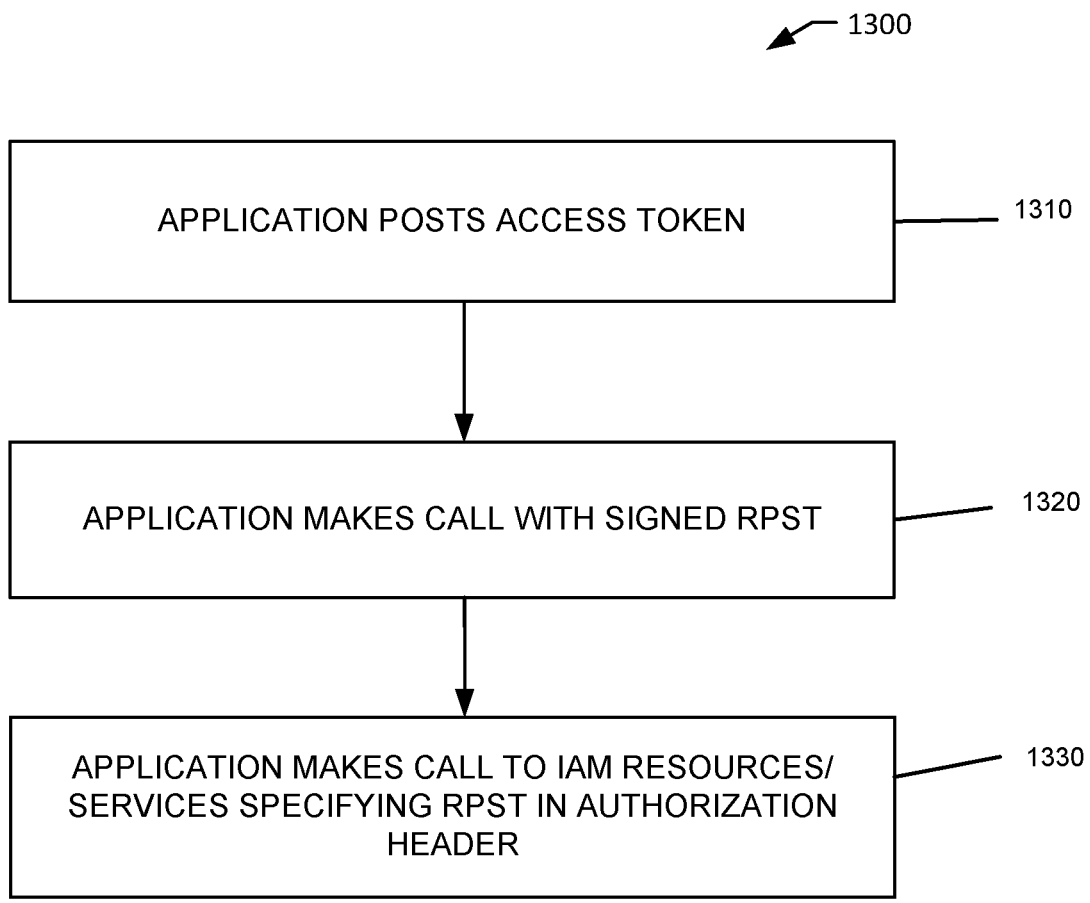
FIG. 13 illustrates an overview of a method of an application exchanging tokens, in accordance with some example embodiments.

At step 1150, the token exchange system can generate a token including the public key of the application. The token is signed by the IAM system and includes the public key of the application. The token that is signed by the IAM system can be generated by token generator 1360 as shown in FIG. 13.

At step 1160, the token exchange system can send the application the token signed by IAM. The token can be used by the application to make future API calls to IAM. The token can also be known as a key. By assigning a key to an application and the key can be used to ensure that the application is what it is claiming to be.

The application is provided an identity and can therefore communicate with resources in an integrated environment and make requests. The application, for the sake of backward compatibility, will continue working with all the entities within their own domains that use or depend on their own bearer token identity.

The application has a token signed by IAM which has the public key of the application. When the application communicates with other IAM API's, requests are signed with a private key and the token is attached.

2. Method—Application Making Call to an IAM API

Figure 12:
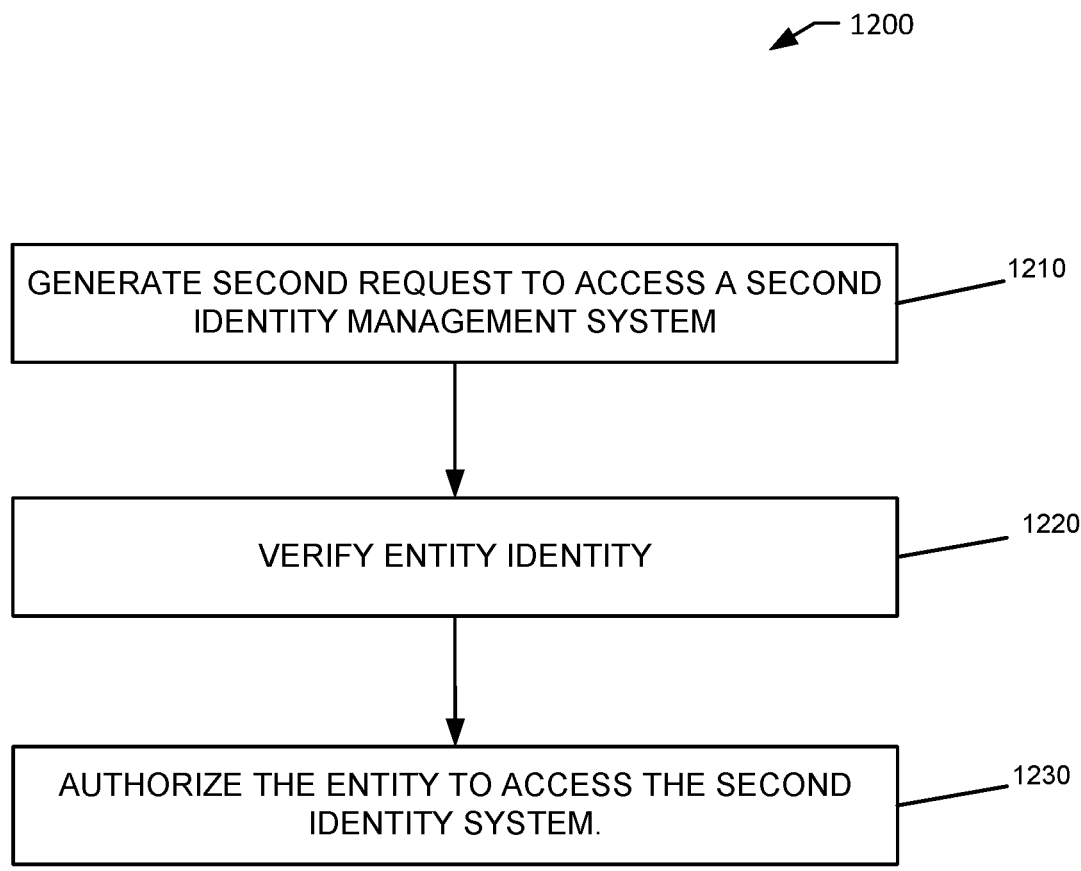
FIG. 12 illustrates a method of an application making a request to an IAM API, in accordance with some example embodiments.

FIG. 12 illustrates a method 1200 of an application making a request to an IAM API, in accordance with some example embodiments At step 1210, the token exchange system can receive a request to access the resource in the second identity system. The request can include the bearer token and the token received from IAM, which includes the public key of the application. The request can be signed by a private key of the application. The application that is making the call can provide a public key to associate it with a returned session token.

If the application makes future API calls, the token exchange system can receive a request for an API call to the IAM. The request includes the public token signed by IAM. The request is signed using the private key of the application.

The application can attach the token received from IAM in any requests and the application can sign also sign the request with the private key of the application. The application can prove is possesses a private key and a valid token from the IAM. Therefore, resources that application is trying to access can verify the identity of the application. The application can make future references to IAM API's by signing the request with the private key of the application and attaching the token signed by the IAM.

At step 1220, the token exchange system can verify that the application is the entity that signed the bearer token based on the public key. The token exchange system can verify that the request is signed with the private key of the application. The token exchange system can compare the received public key of the application with the public key that is stored for the application. The application can then be validated. It is determined that the public token was signed by IAM and it is verified that the private key is a private key of the application and that the application signed the request.

At step 1230, the token exchange system can authorize the entity to access the second identity system. Since the application is capable of demonstrating that is possesses the designated secret information, it can be granted privileges so as to can access other resources.

The application possesses this token and only this application possesses this token. Therefore, the application is allowed to communicate with other resources. The other resources can be sure that the application is who it is claiming to be without a bearer token.

The token is signed and if the public key is stored in the token store, this indicates there is a valid public key. The request is signed with a private key, and the private key can be verified as belonging to the entity. Further, by using the PoP token, issues that may be associated with bearer tokens are avoided. Specifically, other entities cannot impersonate or pretend to be the application making the request.

3. Method—Messaging

Instances are assigned an identity upon creation of the instance. Because an instance can be assigned a resource principal session token identity, they can become part of a dynamic group. Some entities (e.g., applications) do not have a resource principal session token (RPST) identity or a PoP token. Applications (e.g., SaaS application, PaaS applications, fusion applications, etc.) in IDCS were not given a resource principal session token identity, therefore, applications could not become part of a dynamic group in IAM.

FIG. 13 illustrates an overview of a method 1300 of an application exchanging tokens, in accordance with some example embodiments.

At step 1310, the application posts its IDCS access token (e.g., bearer token) to an IDDP (identity data plane). The payload of the request includes a public key of the application. A request may be authenticated either with a signature, or bearer token, or a secret client ID.

At step 1320, the instance of the application makes another call with a signed RPST with a payload. This is on behalf of the token for the payload access token. The payload includes the IDCS access token from the caller to the application instance and target services for the call. If the request includes an authorization bearer token or secret client ID, and a public key, there is no payload access token, then the RPST that is returned can include a public key in the token. If the request is signed with a payload access token, then a token can be returned which does not include the public key in the token.

At step 1330, the application instances makes a call to IAM services by specifying the RPST in the authorization header. It can include an optional token in a token header. The request is signed with RPST private key from step 1310.

In order to access IAM, a request needs to be signed by a private key that shows only the application has this private key. Therefore, it can be verified that the application signed the request.

Since the token, including the public key of the application, was signed by the IAM system, the public key is determined to be a valid public key. Further, since applications are operating using a PoP token, transactions are more secure.

4. Application Token Exchange System

Figure 14:
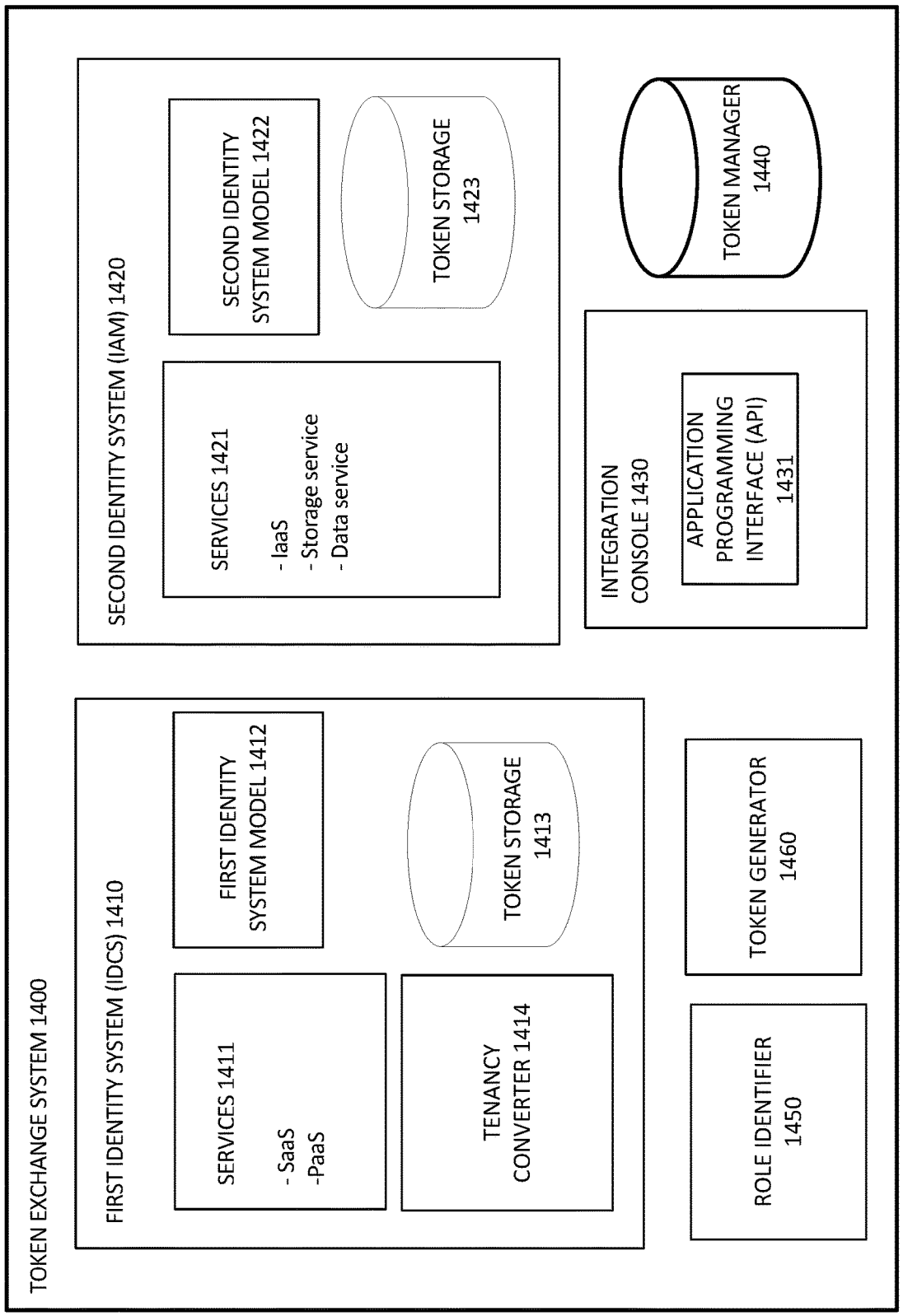
FIG. 14 illustrates a block diagram of a token exchange system for exchanging tokens for an application, in accordance with some example embodiments.

FIG. 14 illustrates a block diagram of a token exchange system 1400 for exchanging tokens for an application, in accordance with some example embodiments. The token exchange system shown in FIG. 14 is similar to the token exchange system of FIG. 2. Therefore the description of similar elements will not be repeated.

The token exchange system 1400 can be part of an Integrated Identity Management System (IDMS)). The token exchange system 1400 interfaces with a first identity system 1410 and a second identity system 1420. The first identity system can correspond to an IDCS and the second identity system can correspond to an IAM. The first identity system 1410 can include services 1411, a first identity system model 1412, and a token storage 1413. The services 1411 can include, for example, SaaS and PaaS services. The second identity system 1420 can include services 1421, second identity system model 1422, and token storage 1423. The services 1421 can include, for example, IaaS, storage services, and data services.

The first identity system model 1412 can include model information for the first identity system. Second identity system model 1422 can include model information for the second identity system.

The token storage 1413 and token storage 1423 can store access tokens associated with the identity system. Token storage 1413 can store, for example, a bearer token. Token storage 1413 and 1423 can also storage an ID token. Token storage 1423 can store, for example, a Proof-of-possession (PoP) token.

The token exchange system 1400 also includes an integration console 1430 and a token manager 1440. The integration console 1430 can include an application programming interface 1421. API 1431 of integration console 1430 can be used to request a token exchange and perform a token exchange between the different identity systems.

The token manager 1440 of the token exchange system 1400 manages the tokens that have been exchanged for an entity. The token manager 1440 manages the tokens that allow an entity to communicate with the first identity system and the second identity system.

Further, the first identity system 1410 of the token exchange system 1400 can also include a tenancy converter 1414. The tenancy converter 1414 can convert a tenancy to a domain. The entities in the domain are able to obtain a PoP token.

The token exchange system 1400 can also include a role identifier 1450 and a token generator 1460. The role identifier 1450 can be used by the token exchange system to determine a role obtained from a bearer token and can determine whether the role complies with requirements needed to access a resource or a service.

The token generator 1460 can be used by the token exchange system 1400 to generate a token that can include the public key of the entity (e.g., application) making a request to access an IAM API. The token can also be known as a key. The generated token can be provided to the entity and the entity can include the token in requests when accessing the IAM API.

In accordance with example embodiments, an application can now be treated as a resource and can be part of a dynamic group. An application can obtain the privileges that are provided to a dynamic group, thus allowing an application to interact and access other resources.

In accordance with example embodiments, an application can be assigned an identity so as to be able to act as a resource principal or a service principal. For example, an application in IDCS can be turned into a resource principal or a service principal in IAM.

An application is given its own identity, such as that given to other resources or services. The application can be integrated and can be treated as a resource or as a party of a dynamic group. Therefore, if an application is logged into an IDCS system, the application can act as a resource and access aspects of an IAM system.

Applications can include applications that are used by clients of the IDCS or IAM system. The applications that are used by clients can also be known as client applications. For example, applications can include SaaS applications, PaaS applications, Fusion Applications (FA) applications or IaaS applications. However, there are merely examples and various types of applications that are used in IDCS and IAM can be a client application. Specifically, applications that would like to access resources of an IDCS or IAM system can be an application that has an identity and can obtain an access token.

Different system have different methods of processing tokens and single-sign on management. Since an IDCS is a different service from an IAM, they process tokens differently. However, it is inconvenient for a user to have to create and manage a first token for accessing a first identity system and create and manage a second token for accessing a second identity system.

Example embodiments provide a single identity solution that provides forward and backward compatibility between different identity systems in a cloud service. An example embodiment provides such a solution in a seamless manner without interrupting operations that are being performed with the different identity systems. The integration can be performed behind the scenes so that end users or customers do not notice the exchange that is occurring.

Example embodiments address problems faced by users when accessing components of different systems, such as different identity management systems. The user can alternate between two different identity management system. The user experience is enhanced and seamless since they do not have to login to each system separately.

Example embodiments allow for exchanging tokens while still maintaining both tokens for the different identity systems. A token is exchanged so as to be able to communicate with both systems. Therefore, a token will be forward and backward compatible. An entity can exchange its token of a first identity system for a token of a second identity system. However, if the entity needs to go back and access the first identity system, the entity maintains the token for the first identity system. Therefore, an entity can continuously interact between identity systems that require different access tokens and that comply with different standards.

Computer Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 15:
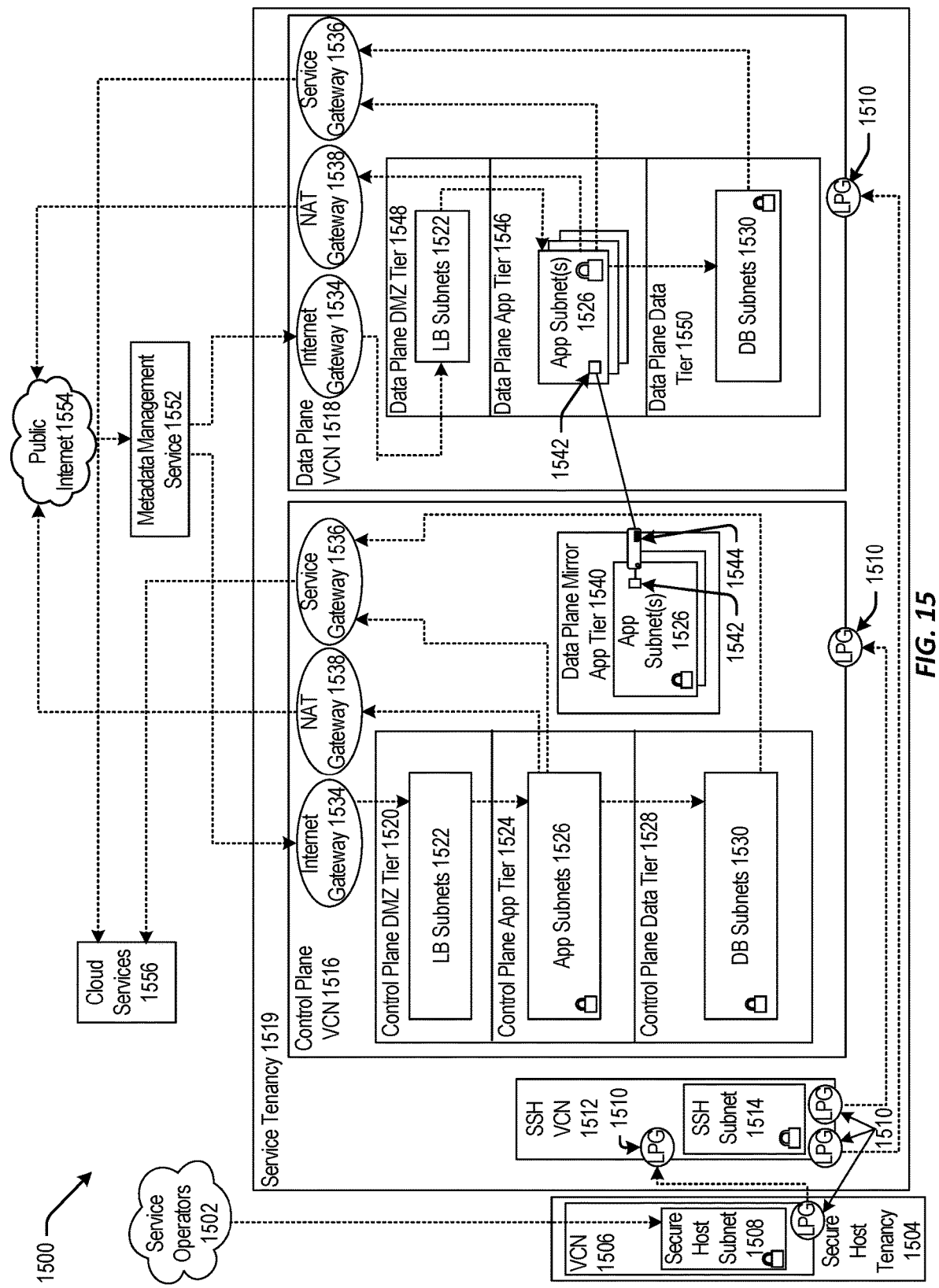
FIG. 15 is a block diagram illustrating one pattern for implementing a cloud infrastructure as a service system, in accordance with some example embodiments.

FIG. 15 is a block diagram illustrating one pattern for implementing a cloud infrastructure as a service system, according to at least one embodiment.

FIG. 15 is a block diagram 1500 illustrating an example pattern of an IaaS architecture, according to at least one embodiment. Service operators 1502 can be communicatively coupled to a secure host tenancy 1504 that can include a virtual cloud network (VCN) 1506 and a secure host subnet 1508. In some examples, the service operators 1502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1506 and/or the Internet.

The VCN 1506 can include a local peering gateway (LPG) 1510 that can be communicatively coupled to a secure shell (SSH) VCN 1512 via an LPG 1510 contained in the SSH VCN 1512. The SSH VCN 1512 can include an SSH subnet 1514, and the SSH VCN 1512 can be communicatively coupled to a control plane VCN 1516 via the LPG 1510 contained in the control plane VCN 1516. Also, the SSH VCN 1512 can be communicatively coupled to a data plane VCN 1518 via an LPG 1510. The control plane VCN 1516 and the data plane VCN 1518 can be contained in a service tenancy 1519 that can be owned and/or operated by the IaaS provider.

The control plane VCN 1516 can include a control plane demilitarized zone (DMZ) tier 1520 that acts as a perimeter network (e.g., portions of a corporate network between the corporate intranet and external networks). The DMZ-based servers may have restricted responsibilities and help keep breaches contained. Additionally, the DMZ tier 1520 can include one or more load balancer (LB) subnet(s) 1522, a control plane app tier 1524 that can include app subnet(s) 1526, a control plane data tier 1528 that can include database (DB) subnet(s) 1530 (e.g., frontend DB subnet(s) and/or backend DB subnet(s)). The LB subnet(s) 1522 contained in the control plane DMZ tier 1520 can be communicatively coupled to the app subnet(s) 1526 contained in the control plane app tier 1524 and an Internet gateway 1534 that can be contained in the control plane VCN 1516, and the app subnet(s) 1526 can be communicatively coupled to the DB subnet(s) 1530 contained in the control plane data tier 1528 and a service gateway 1536 and a network address translation (NAT) gateway 1538. The control plane VCN 1516 can include the service gateway 1536 and the NAT gateway 1538.

The control plane VCN 1516 can include a data plane mirror app tier 1540 that can include app subnet(s) 1526. The app subnet(s) 1526 contained in the data plane mirror app tier 1540 can include a virtual network interface controller (VNIC) 1542 that can execute a compute instance 1544. The compute instance 1544 can communicatively couple the app subnet(s) 1526 of the data plane mirror app tier 1540 to app subnet(s) 1526 that can be contained in a data plane app tier 1546.

The data plane VCN 1518 can include the data plane app tier 1546, a data plane DMZ tier 1548, and a data plane data tier 1550. The data plane DMZ tier 1548 can include LB subnet(s) 1522 that can be communicatively coupled to the app subnet(s) 1526 of the data plane app tier 1546 and the Internet gateway 1534 of the data plane VCN 1518. The app subnet(s) 1526 can be communicatively coupled to the service gateway 1536 of the data plane VCN 1518 and the NAT gateway 1538 of the data plane VCN 1518. The data plane data tier 1550 can also include the DB subnet(s) 1530 that can be communicatively coupled to the app subnet(s) 1526 of the data plane app tier 1546.

The Internet gateway 1534 of the control plane VCN 1516 and of the data plane VCN 1518 can be communicatively coupled to a metadata management service 1552 that can be communicatively coupled to public Internet 1554. Public Internet 1554 can be communicatively coupled to the NAT gateway 1538 of the control plane VCN 1516 and of the data plane VCN 1518. The service gateway 1536 of the control plane VCN 1516 and of the data plane VCN 1518 can be communicatively couple to cloud services 1556.

In some examples, the service gateway 1536 of the control plane VCN 1516 or of the data plan VCN 1518 can make application programming interface (API) calls to cloud services 1556 without going through public Internet 1554. The API calls to cloud services 1556 from the service gateway 1536 can be one-way: the service gateway 1536 can make API calls to cloud services 1556, and cloud services 1556 can send requested data to the service gateway 1536. But, cloud services 1556 may not initiate API calls to the service gateway 1536.

In some examples, the secure host tenancy 1504 can be directly connected to the service tenancy 1519, which may be otherwise isolated. The secure host subnet 1508 can communicate with the SSH subnet 1514 through an LPG 1510 that may enable two-way communication over an otherwise isolated system. Connecting the secure host subnet 1508 to the SSH subnet 1514 may give the secure host subnet 1508 access to other entities within the service tenancy 1519.

The control plane VCN 1516 may allow users of the service tenancy 1519 to set up or otherwise provision desired resources. Desired resources provisioned in the control plane VCN 1516 may be deployed or otherwise used in the data plane VCN 1518. In some examples, the control plane VCN 1516 can be isolated from the data plane VCN 1518, and the data plane mirror app tier 1540 of the control plane VCN 1516 can communicate with the data plane app tier 1546 of the data plane VCN 1518 via VNICs 1542 that can be contained in the data plane mirror app tier 1540 and the data plane app tier 1546.

In some examples, users of the system, or customers, can make requests, for example create, read, update, or delete (CRUD) operations, through public Internet 1554 that can communicate the requests to the metadata management service 1552. The metadata management service 1552 can communicate the request to the control plane VCN 1516 through the Internet gateway 1534. The request can be received by the LB subnet(s) 1522 contained in the control plane DMZ tier 1520. The LB subnet(s) 1522 may determine that the request is valid, and in response to this determination, the LB subnet(s) 1522 can transmit the request to app subnet(s) 1526 contained in the control plane app tier 1524. If the request is validated and requires a call to public Internet 1554, the call to public Internet 1554 may be transmitted to the NAT gateway 1538 that can make the call to public Internet 1554. Memory that may be desired to be stored by the request can be stored in the DB subnet(s) 1530.

In some examples, the data plane mirror app tier 1540 can facilitate direct communication between the control plane VCN 1516 and the data plane VCN 1518. For example, changes, updates, or other suitable modifications to configuration may be desired to be applied to the resources contained in the data plane VCN 1518. Via a VNIC 1542, the control plane VCN 1516 can directly communicate with, and can thereby execute the changes, updates, or other suitable modifications to configuration to, resources contained in the data plane VCN 1518.

In some embodiments, the control plane VCN 1516 and the data plane VCN 1518 can be contained in the service tenancy 1519. In this case, the user, or the customer, of the system may not own or operate either the control plane VCN 1516 or the data plane VCN 1518. Instead, the IaaS provider may own or operate the control plane VCN 1516 and the data plane VCN 1518, both of which may be contained in the service tenancy 1519. This embodiment can enable isolation of networks that may prevent users or customers from interacting with other users', or other customers', resources. Also, this embodiment may allow users or customers of the system to store databases privately without needing to rely on public Internet 1554, which may not have a desired level of threat prevention, for storage.

In other embodiments, the LB subnet(s) 1522 contained in the control plane VCN 1516 can be configured to receive a signal from the service gateway 1536. In this embodiment, the control plane VCN 1516 and the data plane VCN 1518 may be configured to be called by a customer of the IaaS provider without calling public Internet 1554. Customers of the IaaS provider may desire this embodiment since database(s) that the customers use may be controlled by the IaaS provider and may be stored on the service tenancy 1519, which may be isolated from public Internet 1554.

Figure 16:
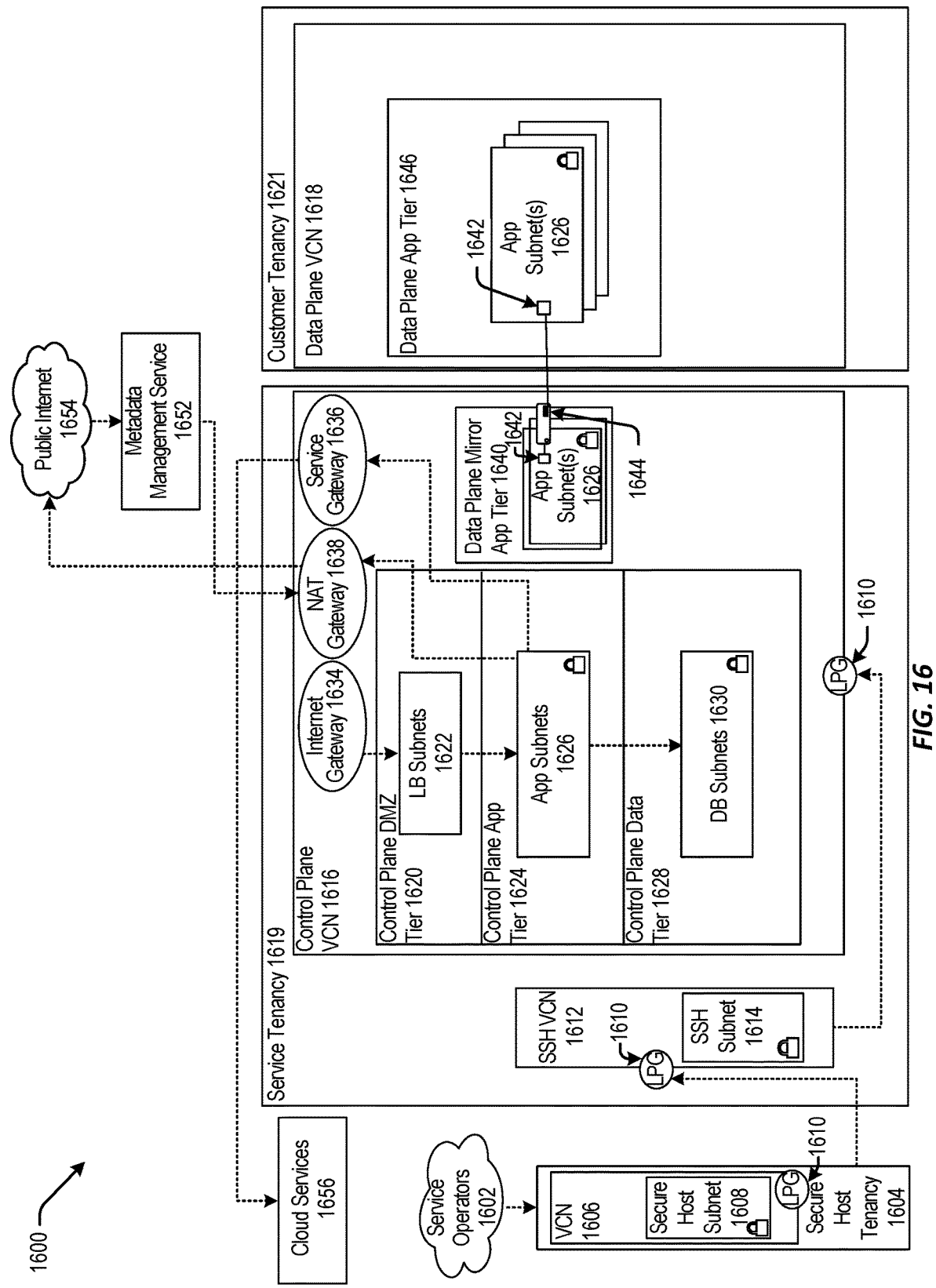
FIG. 16 is a block diagram illustrating another pattern for implementing a cloud infrastructure as a service system, in accordance with some example embodiments.

FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1502 of FIG. 15) can be communicatively coupled to a secure host tenancy 1604 (e.g. the secure host tenancy 1504 of FIG. 15) that can include a virtual cloud network (VCN) 1606 (e.g. the VCN 1506 of FIG. 15) and a secure host subnet 1608 (e.g. the secure host subnet 1508 of FIG. 15). The VCN 1606 can include a local peering gateway (LPG) 1610 (e.g. the LPG 1510 of FIG. 15) that can be communicatively coupled to a secure shell (SSH) VCN 1612 (e.g. the SSH VCN 1512 of FIG. 15) via an LPG 1510 contained in the SSH VCN 1612. The SSH VCN 1612 can include an SSH subnet 1614 (e.g. the SSH subnet 1514 of FIG. 15), and the SSH VCN 1612 can be communicatively coupled to a control plane VCN 1616 (e.g. the control plane VCN 1516 of FIG. 15) via an LPG 1610 contained in the control plane VCN 1616. The control plane VCN 1616 can be contained in a service tenancy 1619 (e.g. the service tenancy 1519 of FIG. 15), and the data plane VCN 1618 (e.g. the data plane VCN 1518 of FIG. 15) can be contained in a customer tenancy 1621 that may be owned or operated by users, or customers, of the system.

The control plane VCN 1616 can include a control plane DMZ tier 1620 (e.g. the control plane DMZ tier 1520 of FIG. 15) that can include LB subnet(s) 1622 (e.g. LB subnet(s) 1522 of FIG. 15), a control plane app tier 1624 (e.g. the control plane app tier 1524 of FIG. 15) that can include app subnet(s) 1626 (e.g. app subnet(s) 1526 of FIG. 15), a control plane data tier 1628 (e.g. the control plane data tier 1528 of FIG. 15) that can include database (DB) subnet(s) 1630 (e.g. similar to DB subnet(s) 1530 of FIG. 15). The LB subnet(s) 1622 contained in the control plane DMZ tier 1620 can be communicatively coupled to the app subnet(s) 1626 contained in the control plane app tier 1624 and an Internet gateway 1634 (e.g. the Internet gateway 1534 of FIG. 15) that can be contained in the control plane VCN 1616, and the app subnet(s) 1626 can be communicatively coupled to the DB subnet(s) 1630 contained in the control plane data tier 1628 and a service gateway 1636 (e.g. the service gateway of FIG. 15) and a network address translation (NAT) gateway 1638 (e.g. the NAT gateway 1538 of FIG. 15). The control plane VCN 1616 can include the service gateway 1636 and the NAT gateway 1638.

The control plane VCN 1616 can include a data plane mirror app tier 1640 (e.g. the data plane mirror app tier 1540 of FIG. 15) that can include app subnet(s) 1626. The app subnet(s) 1626 contained in the data plane mirror app tier 1640 can include a virtual network interface controller (VNIC) 1642 (e.g. the VNIC of 1542) that can execute a compute instance 1644 (e.g. similar to the compute instance 1544 of FIG. 15). The compute instance 1644 can facilitate communication between the app subnet(s) 1626 of the data plane mirror app tier 1640 and the app subnet(s) 1626 that can be contained in a data plane app tier 1646 (e.g. the data plane app tier 1546 of FIG. 15) via the VNIC 1642 contained in the data plane mirror app tier 1640 and the VNIC 1642 contained in the data plan app tier 1646.

The Internet gateway 1634 contained in the control plane VCN 1616 can be communicatively coupled to a metadata management service 1652 (e.g. the metadata management service 1552 of FIG. 15) that can be communicatively coupled to public Internet 1654 (e.g. public Internet 1554 of FIG. 15). Public Internet 1654 can be communicatively coupled to the NAT gateway 1638 contained in the control plane VCN 1616. The service gateway 1636 contained in the control plane VCN 1616 can be communicatively couple to cloud services 1656 (e.g. cloud services 1556 of FIG. 15).

In some examples, the data plane VCN 1618 can be contained in the customer tenancy 1621. In this case, the IaaS provider may provide the control plane VCN 1616 for each customer, and the IaaS provider may, for each customer, set up a unique compute instance 1644 that is contained in the service tenancy 1619. Each compute instance 1644 may allow communication between the control plane VCN 1616, contained in the service tenancy 1619, and the data plane VCN 1618 that is contained in the customer tenancy 1621. The compute instance 1644 may allow resources, that are provisioned in the control plane VCN 1616 that is contained in the service tenancy 1619, to be deployed or otherwise used in the data plane VCN 1618 that is contained in the customer tenancy 1621.

In other examples, the customer of the IaaS provider may have databases that live in the customer tenancy 1621. In this example, the control plane VCN 1616 can include the data plane mirror app tier 1640 that can include app subnet(s) 1626. The data plane mirror app tier 1640 can reside in the data plane VCN 1618, but the data plane mirror app tier 1640 may not live in the data plane VCN 1618. That is, the data plane mirror app tier 1640 may have access to the customer tenancy 1621, but the data plane mirror app tier 1640 may not exist in the data plane VCN 1618 or be owned or operated by the customer of the IaaS provider. The data plane mirror app tier 1640 may be configured to make calls to the data plane VCN 1618 but may not be configured to make calls to any entity contained in the control plane VCN 1616. The customer may desire to deploy or otherwise use resources in the data plane VCN 1618 that are provisioned in the control plane VCN 1616, and the data plane mirror app tier 1640 can facilitate the desired deployment, or other usage of resources, of the customer.

In some embodiments, the customer of the IaaS provider can apply filters to the data plane VCN 1618. In this embodiment, the customer can determine what the data plane VCN 1618 can access, and the customer may restrict access to public Internet 1654 from the data plane VCN 1618. The IaaS provider may not be able to apply filters or otherwise control access of the data plane VCN 1618 to any outside networks or databases. Applying filters and controls by the customer onto the data plane VCN 1618, contained in the customer tenancy 1621, can help isolate the data plane VCN 1618 from other customers and from public Internet 1654.

In some embodiments, cloud services 1656 can be called by the service gateway 1636 to access services that may not exist on public Internet 1654, on the control plane VCN 1616, or on the data plane VCN 1618. The connection between cloud services 1656 and the control plane VCN 1616 or the data plane VCN 1618 may not be live or continuous. Cloud services 1656 may exist on a different network owned or operated by the IaaS provider. Cloud services 1656 may be configured to receive calls from the service gateway 1636 and may be configured to not receive calls from public Internet 1654. Some cloud services 1656 may be isolated from other cloud services 1656, and the control plane VCN 1616 may be isolated from cloud services 1656 that may not be in the same region as the control plane VCN 1616. For example, the control plane VCN 1616 may be located in "Region 1," and cloud service "Deployment 5," may be located in Region 1 and in "Region 2." If a call to Deployment 5 is made by the service gateway 1636 contained in the control plane VCN 1616 located in Region 1, the call may be transmitted to Deployment 5 in Region 1. In this example, the control plane VCN 1616, or Deployment 5 in Region 1, may not be communicatively coupled to, or otherwise in communication with, Deployment 5 in Region 2.

Figure 17:
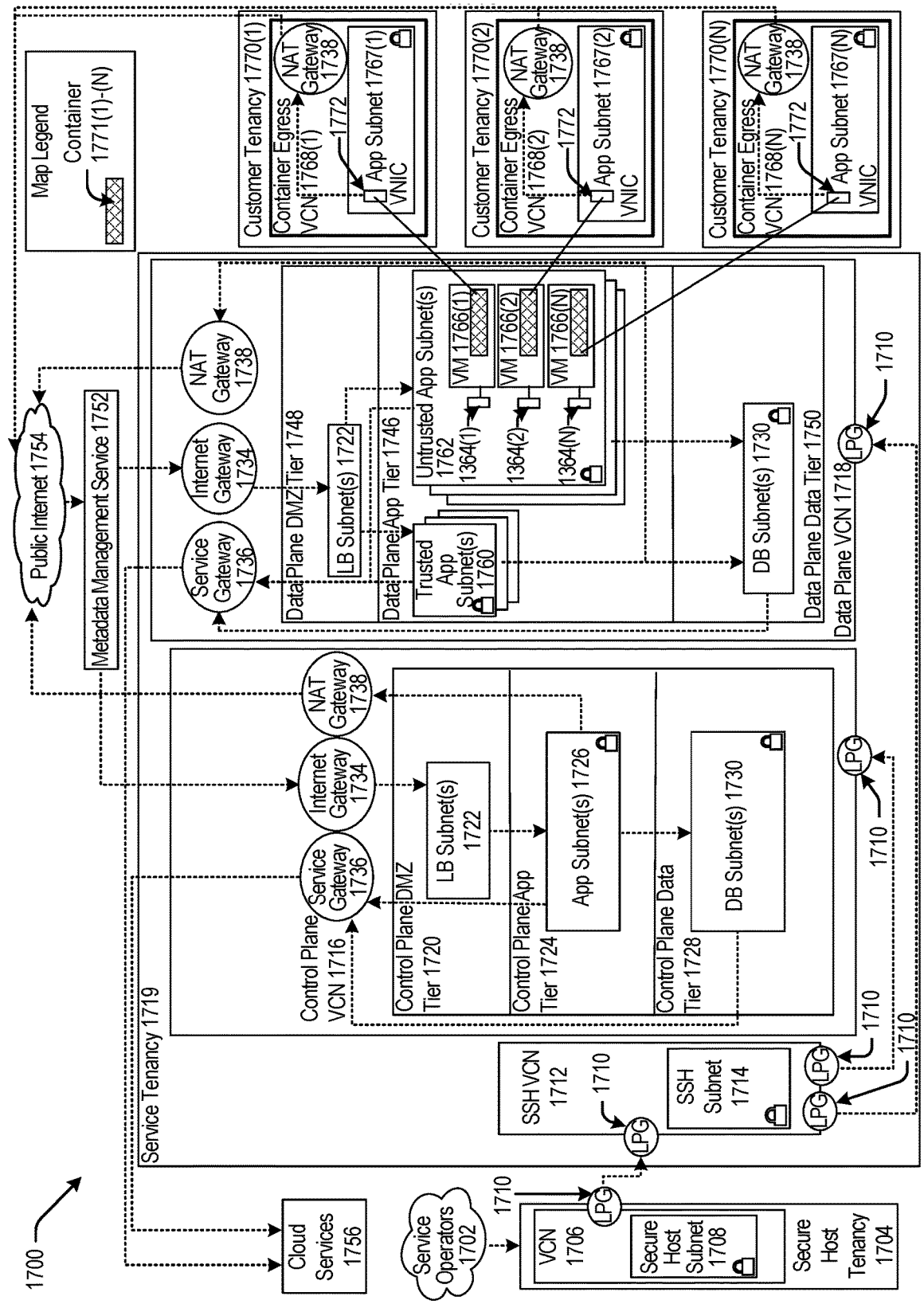
FIG. 17 is a block diagram illustrating another pattern for implementing a cloud infrastructure as a service system, in accordance with some example embodiments.

FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g. service operators 1502 of FIG. 15) can be communicatively coupled to a secure host tenancy 1704 (e.g. the secure host tenancy 1504 of FIG. 15) that can include a virtual cloud network (VCN) 1706 (e.g. the VCN 1506 of FIG. 15) and a secure host subnet 1708 (e.g. the secure host subnet 1508 of FIG. 15). The VCN 1706 can include an LPG 1710 (e.g. the LPG 1510 of FIG. 15) that can be communicatively coupled to an SSH VCN 1712 (e.g. the SSH VCN 1512 of FIG. 15) via an LPG 1710 contained in the SSH VCN 1712. The SSH VCN 1712 can include an SSH subnet 1714 (e.g. the SSH subnet 1514 of FIG. 15), and the SSH VCN 1712 can be communicatively coupled to a control plane VCN 1716 (e.g. the control plane VCN 1516 of FIG. 15) via an LPG 1710 contained in the control plane VCN 1716 and to a data plane VCN 1718 (e.g. the data plane 1518 of FIG. 15) via an LPG 1710 contained in the data plane VCN 1718. The control plane VCN 1716 and the data plane VCN 1718 can be contained in a service tenancy 1719 (e.g. the service tenancy 1519 of FIG. 15).

The control plane VCN 1716 can include a control plane DMZ tier 1720 (e.g. the control plane DMZ tier 1520 of FIG. 15) that can include load balancer (LB) subnet(s) 1722 (e.g. LB subnet(s) 1522 of FIG. 15), a control plane app tier 1724 (e.g. the control plane app tier 1524 of FIG. 15) that can include app subnet(s) 1726 (e.g. similar to app subnet(s) 1526 of FIG. 15), a control plane data tier 1728 (e.g. the control plane data tier 1528 of FIG. 15) that can include DB subnet(s) 1730. The LB subnet(s) 1722 contained in the control plane DMZ tier 1720 can be communicatively coupled to the app subnet(s) 1726 contained in the control plane app tier 1724 and to an Internet gateway 1734 (e.g. the Internet gateway 1534 of FIG. 15) that can be contained in the control plane VCN 1716, and the app subnet(s) 1726 can be communicatively coupled to the DB subnet(s) 1730 contained in the control plane data tier 1728 and to a service gateway 1736 (e.g. the service gateway of FIG. 15) and a network address translation (NAT) gateway 1738 (e.g. the NAT gateway 1538 of FIG. 15). The control plane VCN 1716 can include the service gateway 1736 and the NAT gateway 1738.

The data plane VCN 1718 can include a data plane app tier 1746 (e.g. the data plane app tier 1546 of FIG. 15), a data plane DMZ tier 1748 (e.g. the data plane DMZ tier 1548 of FIG. 15), and a data plane data tier 1750 (e.g. the data plane data tier 1550 of FIG. 15). The data plane DMZ tier 1748 can include LB subnet(s) 1722 that can be communicatively coupled to trusted app subnet(s) 1760 and untrusted app subnet(s) 1762 of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include one or more primary VNICs 1764(1)-(N) that can be communicatively coupled to tenant virtual machines (VMs) 1766(1)-(N). Each tenant VM 1766(1)-(N) can be communicatively coupled to a respective app subnet 1767(1)-(N) that can be contained in respective container egress VCNs 1768(1)-(N) that can be contained in respective customer tenancies 1770(1)-(N). Respective secondary VNICs 1772(1)-(N) can facilitate communication between the untrusted app subnet(s) 1762 contained in the data plane VCN 1718 and the app subnet contained in the container egress VCNs 1768(1)-(N). Each container egress VCNs 1768(1)-(N) can include a NAT gateway 1738 that can be communicatively coupled to public Internet 1754 (e.g. public Internet 1554 of FIG. 15).

The Internet gateway 1734 contained in the control plane VCN 1716 and contained in the data plane VCN 1718 can be communicatively coupled to a metadata management service 1752 (e.g. the metadata management system 1552 of FIG. 15) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some embodiments, the data plane VCN 1718 can be integrated with customer tenancies 1770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1746. Code to run the function may be executed in the VMs 1766(1)-(N), and the code may not be configured to run anywhere else on the data plane VCN 1718. Each VM 1766(1)-(N) may be connected to one customer tenancy 1770. Respective containers 1771(1)-(N) contained in the VMs 1766(1)-(N) may be configured to run the code. In this case, there can be a dual isolation (e.g., the containers 1771(1)-(N) running code, where the containers 1771(1)-(N) may be contained in at least the VM 1766(1)-(N) that are contained in the untrusted app subnet(s) 1762), which may help prevent incorrect or otherwise undesirable code from damaging the network of the IaaS provider or from damaging a network of a different customer. The containers 1771(1)-(N) may be communicatively coupled to the customer tenancy 1770 and may be configured to transmit or receive data from the customer tenancy 1770. The containers 1771(1)-(N) may not be configured to transmit or receive data from any other entity in the data plane VCN 1718. Upon completion of running the code, the IaaS provider may kill or otherwise dispose of the containers 1771(1)-(N).

In some embodiments, the trusted app subnet(s) 1760 may run code that may be owned or operated by the IaaS provider. In this embodiment, the trusted app subnet(s) 1760 may be communicatively coupled to the DB subnet(s) 1730 and be configured to execute CRUD operations in the DB subnet(s) 1730. The untrusted app subnet(s) 1762 may be communicatively coupled to the DB subnet(s) 1730, but in this embodiment, the untrusted app subnet(s) may be configured to execute read operations in the DB subnet(s) 1730. The containers 1771(1)-(N) that can be contained in the VM 1766(1)-(N) of each customer and that may run code from the customer may not be communicatively coupled with the DB subnet(s) 1730.

In other embodiments, the control plane VCN 1716 and the data plane VCN 1718 may not be directly communicatively coupled. In this embodiment, there may be no direct communication between the control plane VCN 1716 and the data plane VCN 1718. However, communication can occur indirectly through at least one method. An LPG 1710 may be established by the IaaS provider that can facilitate communication between the control plane VCN 1716 and the data plane VCN 1718. In another example, the control plane VCN 1716 or the data plane VCN 1718 can make a call to cloud services 1756 via the service gateway 1736. For example, a call to cloud services 1756 from the control plane VCN 1716 can include a request for a service that can communicate with the data plane VCN 1718.

Figure 18:
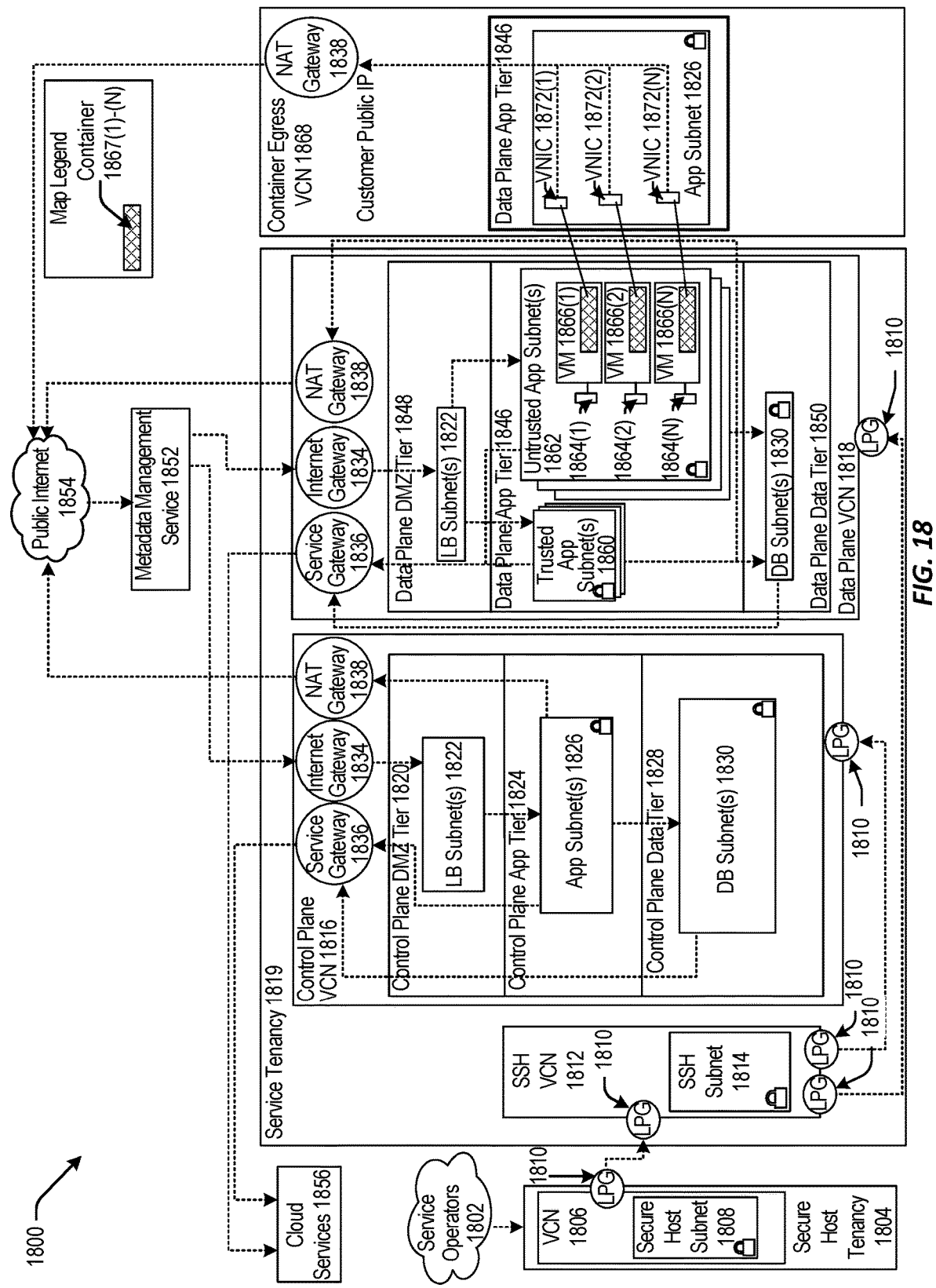
FIG. 18 is a block diagram illustrating another pattern for implementing a cloud infrastructure as a service system, in accordance with some example embodiments.

FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g. service operators 1502 of FIG. 15) can be communicatively coupled to a secure host tenancy 1804 (e.g. the secure host tenancy 1504 of FIG. 15) that can include a virtual cloud network (VCN) 1806 (e.g. the VCN 1506 of FIG. 15) and a secure host subnet 1808 (e.g. the secure host subnet 1508 of FIG. 15). The VCN 1806 can include an LPG 1810 (e.g. the LPG 1510 of FIG. 15) that can be communicatively coupled to an SSH VCN 1812 (e.g. the SSH VCN 1512 of FIG. 15) via an LPG 1810 contained in the SSH VCN 1812. The SSH VCN 1812 can include an SSH subnet 1814 (e.g. the SSH subnet 1514 of FIG. 15), and the SSH VCN 1812 can be communicatively coupled to a control plane VCN 1816 (e.g. the control plane VCN 1516 of FIG. 15) via an LPG 1810 contained in the control plane VCN 1816 and to a data plane VCN 1818 (e.g. the data plane 1518 of FIG. 15) via an LPG 1810 contained in the data plane VCN 1818. The control plane VCN 1816 and the data plane VCN 1818 can be contained in a service tenancy 1819 (e.g. the service tenancy 1519 of FIG. 15).

The control plane VCN 1816 can include a control plane DMZ tier 1820 (e.g. the control plane DMZ tier 1520 of FIG. 15) that can include LB subnet(s) 1822 (e.g. LB subnet(s) 1522 of FIG. 15), a control plane app tier 1824 (e.g. the control plane app tier 1524 of FIG. 15) that can include app subnet(s) 1826 (e.g. app subnet(s) 1526 of FIG. 15), a control plane data tier 1828 (e.g. the control plane data tier 1528 of FIG. 15) that can include DB subnet(s) 1830 (e.g. DB subnet(s) 1730 of FIG. 17). The LB subnet(s) 1822 contained in the control plane DMZ tier 1820 can be communicatively coupled to the app subnet(s) 1826 contained in the control plane app tier 1824 and to an Internet gateway 1834 (e.g. the Internet gateway 1534 of FIG. 15) that can be contained in the control plane VCN 1816, and the app subnet(s) 1826 can be communicatively coupled to the DB subnet(s) 1830 contained in the control plane data tier 1828 and to a service gateway 1836 (e.g. the service gateway of FIG. 15) and a network address translation (NAT) gateway 1838 (e.g. the NAT gateway 1538 of FIG. 15). The control plane VCN 1816 can include the service gateway 1836 and the NAT gateway 1838.

The data plane VCN 1818 can include a data plane app tier 1846 (e.g. the data plane app tier 1546 of FIG. 15), a data plane DMZ tier 1848 (e.g. the data plane DMZ tier 1548 of FIG. 15), and a data plane data tier 1850 (e.g. the data plane data tier 1550 of FIG. 15). The data plane DMZ tier 1848 can include LB subnet(s) 1822 that can be communicatively coupled to trusted app subnet(s) 1860 (e.g. trusted app subnet(s) 1760 of FIG. 17) and untrusted app subnet(s) 1862 (e.g. untrusted app subnet(s) 1762 of FIG. 17) of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include primary VNICs 1864(1)-(N) that can be communicatively coupled to tenant virtual machines (VMs) 1866(1)-(N) residing within the untrusted app subnet(s) 1862. Each tenant VM 1866(1)-(N) can run code in a respective container 1867(1)-(N), and be communicatively coupled to an app subnet 1826 that can be contained in a data plane app tier 1846 that can be contained in a container egress VCN 1868. Respective secondary VNICs 1872(1)-(N) can facilitate communication between the untrusted app subnet(s) 1862 contained in the data plane VCN 1818 and the app subnet contained in the container egress VCN 1868. The container egress VCN can include a NAT gateway 1838 that can be communicatively coupled to public Internet 1854 (e.g. public Internet 1554 of FIG. 15).

The Internet gateway 1834 contained in the control plane VCN 1816 and contained in the data plane VCN 1818 can be communicatively coupled to a metadata management service 1852 (e.g. the metadata management system 1552 of FIG. 15) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some examples, the pattern illustrated by the architecture of block diagram 1800 of FIG. 18 may be considered an exception to the pattern illustrated by the architecture of block diagram 1700 of FIG. 17 and may be desirable for a customer of the IaaS provider if the IaaS provider cannot directly communicate with the customer (e.g., a disconnected region). The respective containers 1867(1)-(N) that are contained in the VMs 866(1)-(N) for each customer can be accessed in real-time by the customer. The containers 1867(1)-(N) may be configured to make calls to respective secondary VNICs 1872(1)-(N) contained in app subnet(s) 1826 of the data plane app tier 1846 that can be contained in the container egress VCN 1868. The secondary VNICs 1872(1)-(N) can transmit the calls to the NAT gateway 1838 that may transmit the calls to public Internet 1854. In this example, the containers 1867(1)-(N) that can be accessed in real-time by the customer can be isolated from the control plane VCN 1816 and can be isolated from other entities contained in the data plane VCN 1818. The containers 1867(1)-(N) may also be isolated from resources from other customers.

In other examples, the customer can use the containers 1867(1)-(N) to call cloud services 1856. In this example, the customer may run code in the containers 1867(1)-(N) that requests a service from cloud services 1856. The containers 1867(1)-(N) can transmit this request to the secondary VNICs 1872(1)-(N) that can transmit the request to the NAT gateway that can transmit the request to public Internet 1854. Public Internet 1854 can transmit the request to LB subnet(s) 1822 contained in the control plane VCN 1816 via the Internet gateway 1834. In response to determining the request is valid, the LB subnet(s) can transmit the request to app subnet(s) 1826 that can transmit the request to cloud services 1856 via the service gateway 1836.

It should be appreciated that IaaS architectures 1500, 1600, 1700, 1800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 19:
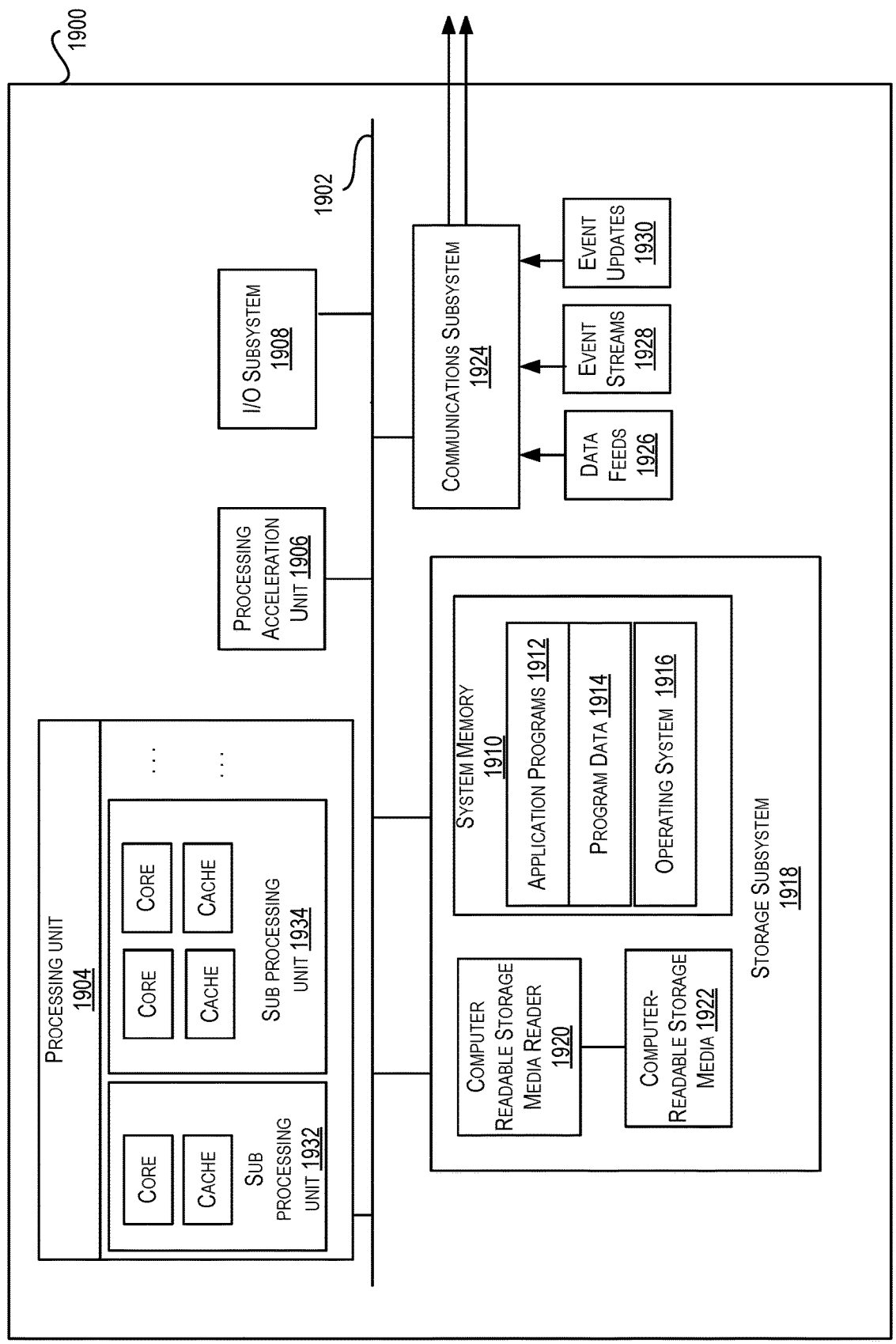
FIG. 19 is a block diagram illustrating an example computer system, in accordance with some example embodiments.

FIG. 19 is a block diagram illustrating an example computer system, according to at least one embodiment.

FIG. 19 illustrates an example computer system 1900, in which various embodiments of the present disclosure may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that provides a tangible non-transitory computer-readable storage medium for storing software and data constructs that provide the functionality of the embodiments described in this disclosure. The software can include programs, code systems, instructions, scripts, etc., that when executed by one or more cores or processors of processing unit 1904 provide the functionality described above. Storage subsystem 1918 may also provide a repository for storing data used in accordance with the present disclosure.

As depicted in the example in FIG. 19, storage subsystem 1918 can include various components including a system memory 1910, computer-readable storage media 1922, and a computer readable storage media reader 1920. System memory 1910 may store program instructions that are loadable and executable by processing unit 1904. System memory 1910 may also store data that is used during the execution of the instructions and/or data that is generated during the execution of the program instructions. Various different kinds of programs may be loaded into system memory 1910 including but not limited to client applications, Web browsers, mid-tier applications, relational database management systems (RDBMS), virtual machines, containers, etc.

System memory 1910 may also store an operating system 1916. Examples of operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1900 executes one or more virtual machines, the virtual machines along with their guest operating systems (GOSs) may be loaded into system memory 1910 and executed by one or more processors or cores of processing unit 1904.

System memory 1910 can come in different configurations depending upon the type of computer system 1900. For example, system memory 1910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1910 may include a basic input/output system (BIOS) containing basic routines that help to transfer information between elements within computer system 1900, such as during start-up.

Computer-readable storage media 1922 may represent remote, local, fixed, and/or removable storage devices plus storage media for temporarily and/or more permanently containing, storing, computer-readable information for use by computer system 1900 including instructions executable by processing unit 1904 of computer system 1900.

Computer-readable storage media 1922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program systems, and other data for computer system 1900.

Machine-readable instructions executable by one or more processors or cores of processing unit 1904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other types of storage device.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or systems are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   determining, by a token exchange system of an integrated identity management system of a cloud service, that an entity is authorized to access a first identity system, wherein the entity is an application,
   wherein the first identity system is in a first domain;
   generating, by the token exchange system, a first request for the entity to access a second identity system, wherein the first request includes a bearer token and a first public key associated with the entity;
   verifying, by the token exchange system, that the bearer token is a valid bearer token;
   verifying, by the token exchange system, whether a role of the entity is a role that is authorized to access the second identity system;
   generating, by the token exchange system, a second token based on the bearer token and the first public key received in the first request;
   sending, by the token exchange system to the entity, the second token that is generated based on the bearer token and the first public key received in the first request;
   generating, by the token exchange system, a second request for the entity to access the second identity system, wherein the second request comprises the second token; and
   verifying, by the token exchange system, the second token and authorizing the entity to access an application programming interface (API) of the second identity system based upon successfully verifying the second token, wherein authorizing the entity to access the API of the second identity system comprises granting entity privileges of a service principal or a resource principal,
   wherein the second token is a Proof-of-Possession (POP) token associated with the second identity system, and the second token includes the first public key of the entity,
   wherein the second identity system is in a second domain different from the first domain.

2. The method according to claim 1, further comprising:
   verifying, by the token exchange system, that the entity has an identity that is authorized to access the second identity system; and
   authorizing, by the token exchange system, the entity to access the second identity system based upon verifying that the entity has an identity that is authorized to access the second identity system,
   wherein the second request is signed by a private key of the entity.

3. The method according to claim 2, wherein verifying that the entity has the identity that is authorized to access the second identity system comprises:
   verifying, by the token exchange system, that the entity is the entity that signed the second request; and
   verifying, by the token exchange system, that the second token is authorized to access the second identity system.

4. The method according to claim 1, wherein authorizing the entity to access the second identity system comprises granting the entity privileges of a resource principal.

5. The method according to claim 1, wherein authorizing the entity to access the second identity system comprises granting the entity privileges of a service principal.

6. The method according to claim 4, wherein the resource principal is authorized to access resources of the second identity system.

7. The method according to claim 5, wherein the service principal is authorized to access services of the second identity system.

8. The method according to claim 1, wherein the entity is authorized to access the application programming interface (API) of the second identity system using the second token without requiring entry of entity credentials in the second identity system.

9. The method according to claim 2, wherein the entity is determined to be authorized to access the first identity system based on credentials of the entity for the first identity system.

10. The method according to claim 1, wherein the first identity system has a first system model, and wherein the second identity system has a second system model that has different specifications from the first system model.

11. The method according to claim 1, wherein the entity is an integrated cloud service application.

12. The method according to claim 11, wherein the integrated cloud service application is a SaaS application, a PaaS application or a fusion application.

13. A computer-program product tangibly embodied in one or more non-transitory machine-readable media, including instructions configured to cause one or more data processors to perform a method comprising:
    determining, by a token exchange system of an integrated identity management system of a cloud service, that an entity is authorized to access a first identity system,
    wherein the entity is an application,
    wherein the first identity system is in a first domain;
    generating, by the token exchange system, a first request for the entity to access a second identity system, wherein the first request includes a bearer token and a first public key associated with the entity;
    verifying, by the token exchange system, that the bearer token is a valid bearer token;
    verifying, by the token exchange system, whether a role of the entity is a role that is authorized to access the second identity system;
    generating, by the token exchange system, a second token based on the bearer token and the first public key received in the first request;
    sending, by the token exchange system to the entity, the second token that is generated based on the bearer token and the first public key received in the first request;
    generating, by the token exchange system, a second request for the entity to access the second identity system, wherein the second request comprises the second token; and
    verifying, by the token exchange system, the second token and authorizing the entity to access an application programming interface (API) of the second identity system based upon successfully verifying the second token, wherein authorizing the entity to access the API of the second identity system comprises granting entity privileges of a service principal or a resource principal, wherein the second token is a Proof-of-Possession (POP) token associated with the second identity system, and the second token includes the first public key of the entity, wherein the second identity system is in a second domain different from the first domain.

14. The computer-program product according to claim 13, further comprising:
verifying, by the token exchange system, that the entity has an identity that is authorized to access the second identity system; and
authorizing, by the token exchange system, the entity to access the second identity system based upon verifying that the entity has an identity that is authorized to access the second identity system,
wherein the second request is signed by a private key of the entity.

15. The computer-program product according to claim 14, wherein verifying that the entity has the identity that is authorized to access the second identity system comprises:
verifying, by the token exchange system, that the entity is the entity that signed the second request; and
verifying, by the token exchange system, that the second token is authorized to access the second identity system.

16. A system comprising:
one or more data processors; and
one or more non-transitory computer readable media storing instructions which, when executed by the one or more data processors, cause the one or more data processors to perform a method comprising:
determining, by a token exchange system of an integrated identity management system of a cloud service, that an entity is authorized to access a first identity system,
wherein the entity is an application,
wherein the first identity system is in a first domain;
generating, by the token exchange system, a first request for the entity to access a second identity system, wherein the first request includes a bearer token and a first public key associated with the entity;
verifying, by the token exchange system, that the bearer token is a valid bearer token;
verifying, by the token exchange system, whether a role of the entity is a role that is authorized to access the second identity system;
generating, by the token exchange system, a second token based on the bearer token and the first public key received in the first request;
sending, by the token exchange system to the entity, the second token that is generated based on the bearer token and the first public key received in the first request;
generating, by the token exchange system, a second request for the entity to access the second identity system, wherein the second request comprises the second token; and
verifying, by the token exchange system, the second token and authorizing the entity to access an application programming interface (API) of the second identity system based upon successfully verifying the second token, wherein authorizing the entity to access the API of the second identity system comprises granting entity privileges of a service principal or a resource principal,
wherein the second token is a Proof-of-Possession (POP) token associated with the second identity system, and the second token includes the first public key of the entity,
wherein the second identity system is in a second domain different from the first domain.

17. The system according to claim 16, further comprising:
verifying, by the token exchange system, that the entity has an identity that is authorized to access the second identity system; and
authorizing, by the token exchange system, the entity to access the second identity system based upon verifying that the entity has an identity that is authorized to access the second identity system,
wherein the second request is signed by a private key of the entity.

18. The system according to claim 17, wherein verifying that the entity has the identity that is authorized to access the second identity system comprises:
verifying, by the token exchange system, that the entity is the entity that signed the second request; and
verifying, by the token exchange system, that the second token is authorized to access the second identity system.

19. The method according to claim 1, wherein the first identity system is an Identity Cloud Service (IDCS) system, and wherein the second identity system is an Infrastructure Identity and Access Management (IAM) system.

* * * * *

UNITED STATES PATENT AND TRADEMARK OFFICE
CERTIFICATE OF CORRECTION

PATENT NO. : 12,316,762 B2  
APPLICATION NO. : 17/953175  
DATED : May 27, 2025  
INVENTOR(S) : Wilson et al.

Page 1 of 1

It is certified that error appears in the above-identified patent and that said Letters Patent is hereby corrected as shown below:

In the Drawings

On sheet 5 of 19, in FIG. 5, Line 1, under reference numeral 502, delete "OAuthProctedAPI" and insert -- OAuthProtectedAPI --, therefor.

On sheet 5 of 19, in FIG. 5, Line 17, delete "OAuthProctedAPI" and insert -- OAuthProtectedAPI --, therefor.

In the Claims

In Column 37, Line 49, in Claim 1, delete "(POP)" and insert -- (PoP) --, therefor.

In Column 39, Line 5, in Claim 13, delete "(POP)" and insert -- (PoP) --, therefor.

In Column 40, Line 22, in Claim 16, delete "(POP)" and insert -- (PoP) --, therefor.

Signed and Sealed this  
Twelfth Day of August, 2025

Coke Morgan Stewart  
*Acting Director of the United States Patent and Trademark Office*